(12) United States Patent
Bathiche et al.

(10) Patent No.: US 12,510,961 B2
(45) Date of Patent: Dec. 30, 2025

(54) CONTROLLING A FUNCTION VIA GAZE DETECTION

(71) Applicant: Microsoft Technology Licensing, LLC, Redmond, WA (US)

(72) Inventors: Steven N. Bathiche, Bellevue, WA (US); Eric Chris Wolfgang Sommerlade, Oxford (GB); Vivek Pradeep, Redmond, WA (US); Alexandros Neofytou, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/588,168

(22) Filed: Feb. 27, 2024

(65) Prior Publication Data
US 2024/0256035 A1 Aug. 1, 2024

Related U.S. Application Data

(63) Continuation of application No. 17/146,719, filed on Jan. 12, 2021, now abandoned.

(51) Int. Cl.
*G06F 3/01* (2006.01)
*G06F 21/32* (2013.01)
(Continued)

(52) U.S. Cl.
CPC .............. *G06F 3/013* (2013.01); *G06F 21/32* (2013.01); *G06N 3/04* (2013.01); *G06T 7/73* (2017.01);
(Continued)

(58) Field of Classification Search
CPC .......... G06F 3/013; G06F 21/32; G06F 21/31; G06T 7/73; G06T 2207/20084;
(Continued)

(56) References Cited

U.S. PATENT DOCUMENTS

| 10,772,494 B1 | 9/2020 | Konrad |
| 2010/0205667 A1 | 8/2010 | Anderson |

(Continued)

FOREIGN PATENT DOCUMENTS

| EP | 2887651 A1 | 6/2015 | |
| WO | WO-2012153213 A1 * | 11/2012 | ......... G06F 16/9577 |
| WO | 2020181523 A1 | 9/2020 | |

OTHER PUBLICATIONS

Communication pursuant to Article 94(3) EPC, Received for European Application No. 21847565.5, mailed on Dec. 17, 2024, 7 pages.

(Continued)

*Primary Examiner* — Stephen G Sherman

(57) ABSTRACT

Aspects of the present disclosure relate to systems and methods for controlling a function of a computing system using gaze detection. In examples, one or more images of a user are received and gaze information may be determined from the received one or more images. Non-gaze information may be received when the gaze information is determined to satisfy a condition. Accordingly, a function may be enabled based on the received non-gaze information. In examples, the gaze information may be determined by extracting a plurality of features from the received one or more images, providing the plurality of features to a neural network, and determining, utilizing the neural network, a location at a display device at which a gaze of the user is directed.

20 Claims, 16 Drawing Sheets

(51) Int. Cl.
  *G06N 3/04* (2023.01)
  *G06T 7/73* (2017.01)
  *G06V 40/16* (2022.01)
  *H04N 23/611* (2023.01)
(52) U.S. Cl.
  CPC ........... *G06V 40/16* (2022.01); *H04N 23/611* (2023.01); *G06T 2207/20084* (2013.01)
(58) Field of Classification Search
  CPC .... G06V 40/16; G06V 40/161; G06V 40/168; G06V 40/172; G06V 40/18; G06V 10/454; G06V 10/82; H04N 23/00; G06N 3/04; Y02D 10/00
  See application file for complete search history.

(56) References Cited

U.S. PATENT DOCUMENTS

| | | |
|---|---|---|
| 2015/0149961 A1 | 5/2015 | Karakotsios |
| 2016/0274660 A1 | 9/2016 | Publicover et al. |
| 2017/0132399 A1 | 5/2017 | Pawluk et al. |
| 2020/0004333 A1 | 1/2020 | Lee |
| 2021/0382542 A1 | 12/2021 | Liu et al. |
| 2023/0230416 A1 | 7/2023 | Dal Zotto et al. |

OTHER PUBLICATIONS

Final Office Action mailed on Nov. 27, 2023, in U.S. Appl. No. 17/146,719, 24 pages.
Non-Final Office Action mailed on Dec. 22, 2023, in U.S. Appl. No. 18/205,894, 21 pages.

\* cited by examiner

CONTROLLING A FUNCTION VIA GAZE DETECTION

CROSS-REFERENCE TO RELATED APPLICATIONS

This application is a continuation of U.S. patent application Ser. No. 17/146,719, filed on Jan. 12, 2021, the disclosure of which is hereby incorporated by reference in its entirety.

BACKGROUND

Striking the right balance between predicting user actions and conserving computing resources is difficult to do in computing systems. Many computing systems rely on inactivity timers, such as watchdog timers to control one or more functions or applications in an effort allow a user to interact with a computing system without consistently expending computing resources. For example, a computing system may enter a screensaver mode, dim a display, or lock a display in an effort to save power and protect content from unauthorized access. In some instances, however, actions taken by a computing system may frustrate a user. For example, while a user may be viewing content at a computing system display, the computing system may enter a locked state or enact a screensaver due to a lack of user activity or interaction with the computing system. In other examples, computing systems that rely on image-based activity systems, such as a facial recognition system, to authenticate and/or authorize users may inadvertently unlock or grant access to a user or increase a brightness of display device merely because the user appears within a field-of-view of a camera of the computing system. Thus, while the computing system may be readied for user interaction, the user may not desire to engage with the computing system thereby wasting computational resources such as energy. Further, while an image-based activity system may monitor user movement, monitoring user movement in real-time becomes impractical due at least in part to the excessive consumption of resources, such as power and/or computing cycles. It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to determining a user intent based on gaze information acquired for the user. The user intent, or gaze information, may then be used to control one or more functions associated with a computing device or system. As an example, a user may be interacting with a computing system that uses an image of a user together with a facial recognition system and/or a face-based authentication system to authenticate the user to a computing system. Accordingly, the user may be granted access to the computing system and/or one or more capabilities provided by the computing system. However, in accordance with examples of the present disclosure, a user's gaze is acquired and is used as a basis for controlling a subsequent function, such as invoking the facial recognition system and/or the face-based authentication system to authenticate the user. Accordingly, a user is not inadvertently granted access to a computing system merely because an image includes the user. Similarly, the user's gaze may be utilized to control a brightness of a display, provide extra security with respect to displayed content, and/or enable device functions based on one or more detected activities.

In accordance with some examples of the present disclosure, a method for controlling a function via gaze detection is described. The method may include receiving one or more images of a user; determining gaze information from the received one or more images; receiving non-gaze information when the gaze information is determined to satisfy a condition; and enabling a function based on the non-gaze information.

In accordance with some examples of the present disclosure, a system for controlling a function via gaze detection is described. The system may include a processor; an image sensor; and memory including instructions, which when executed by the processor, cause the processor to receive one or more images of a user from the image sensor; determine gaze information from the received one or more images; determine if the gaze information satisfies a condition; receive non-gaze information associated with at least one of a function or application of a computing system when the gaze information satisfies the condition; and enable the at least one function or application based on non-gaze information.

In accordance with some examples of the present disclosure, a computer storage medium including instructions, which when executed by a processor, cause the processor to control at least one of a function or application of a computing system is described. The instructions may cause the processor to receive one or more images of a user from an image sensor; determine gaze information from the received one or more images; determine if the gaze information satisfies a condition; receive device dependent information associated with at least one of a function or application of a computing system when the gaze information is determined to satisfy the condition; and enable at least one function or application based on the device dependent information. In accordance with at least one aspect of the above example, the instructions, which when executed by a processor, cause the processor to: extract a plurality of features from the received one or more images; provide the plurality of features to a neural network; and determine, utilizing the neural network, a location at a display device at which a gaze of the user is directed, wherein, the gaze information satisfies the condition when the location at a display device at which the gaze of the user is directed coincides with a region including a graphical element associated with the at least one function or application.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
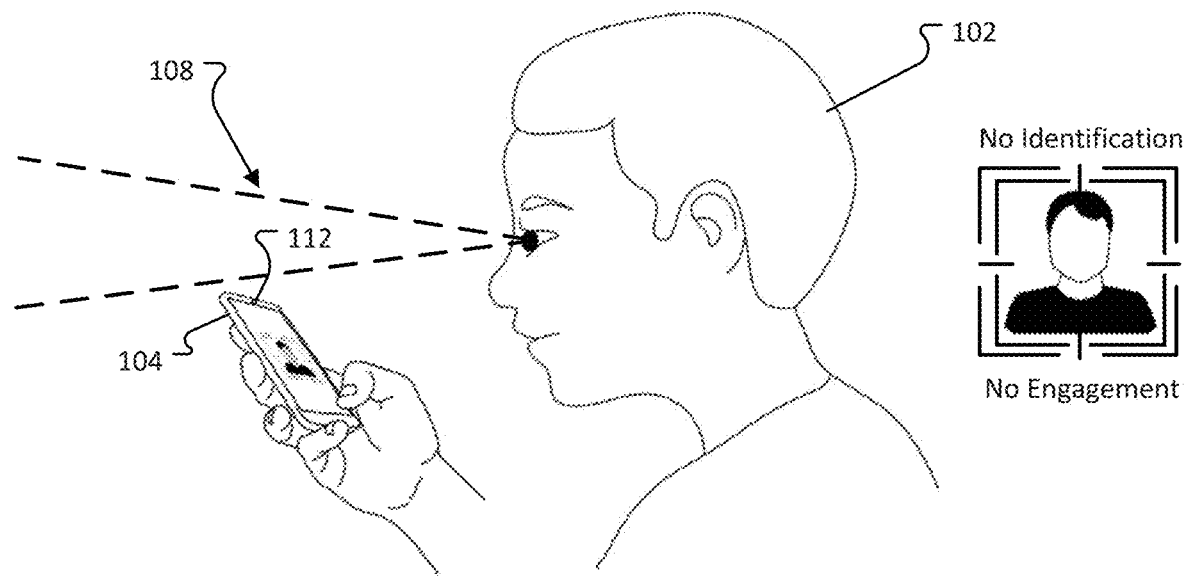
FIGS. 1A-1B depict an example of controlling one or more functions of a computing system in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Aspects of the present disclosure are directed to determining a user intent based on gaze information acquired for the user and then using the intent, or gaze information, to control one or more functions associated with a computing device or system. For example, a user may be interacting with a computing system, that may utilize a facial recognition system and/or a face-based authentication system to authenticate the user, thereby allowing the user access to the computing system and/or one or more capabilities provided by the computing system. In examples, the computing system may include an image sensor having a field-of-view and capable of acquiring one or more images of the user, such that the one or more images of the user may be processed and used as a basis for authenticating the user with the computing system or another capability of the computing system. That is, the one or more images of the user may allow the user to login to the computing system, serve as an access credential, and/or prevent the mobile computing system from locking a display due, at least in part to, a lack of user interaction with the computing system.

However, situations arise when one or more functions of the computing system may be triggered upon acquisition of the one or more images even though an intent of the user may be otherwise. For example, a user may be holding a computing system, such as a phone, and may not intend to unlock or otherwise interact with the phone. That is, one or more images may be acquired when the user may be within the field-of-view of the image sensor; the one or more images of the user may then be processed and a function, such as a device unlock function may occur. Such unlock function may occur even when the user is not interacting with or otherwise intending to engage with or otherwise use the computing system but the user happens to be within the field-of-view of the image sensor. In addition to unintentionally unlocking the computing system, an amount of power consumed by the computing system may increase when such function is triggered. For example, the display of the computing system displays content and a brightness of the display may be increased, and/or other computational resources may be expended. Thus, while the computing system may be readied for user interaction, the user may not desire to engage with the computing system thereby wasting computational resources such as energy.

As another example, a user may be using a computing system, such as the computing system, and the computing system may invoke one or more functions based on a timed event in order to reduce an amount of power consumed by the device. For example, a user may be viewing content on a device, and other than viewing such content, may not interact with the computing system. Based on a lack of detected interaction, the device may dim the display thereby reducing an amount of power consumed by the computing system without regard to whether or not the user is viewing content or otherwise interacting with the device. In addition to potentially annoying the user, the dimmed display may serve as a distraction to the user, diverting the user's attention from an immediate task at hand and instead to focus on increasing the brightness of the display.

In accordance with examples of the present disclosure, one or more functions of the computing system may be controlled by or otherwise depend on a user gaze. The user gaze generally occurs when a user looks steadily and intently at an object or in a particular direction. The user gaze may be detected by or otherwise determined by the computing system using the image sensor. That is, the image sensor may acquire one or more images and determine the user gaze based on the one or more images. The gaze may then be used to control one or more functions, such as causing a display to increase brightness, unlocking a computing system, etc.

Figure 1B:
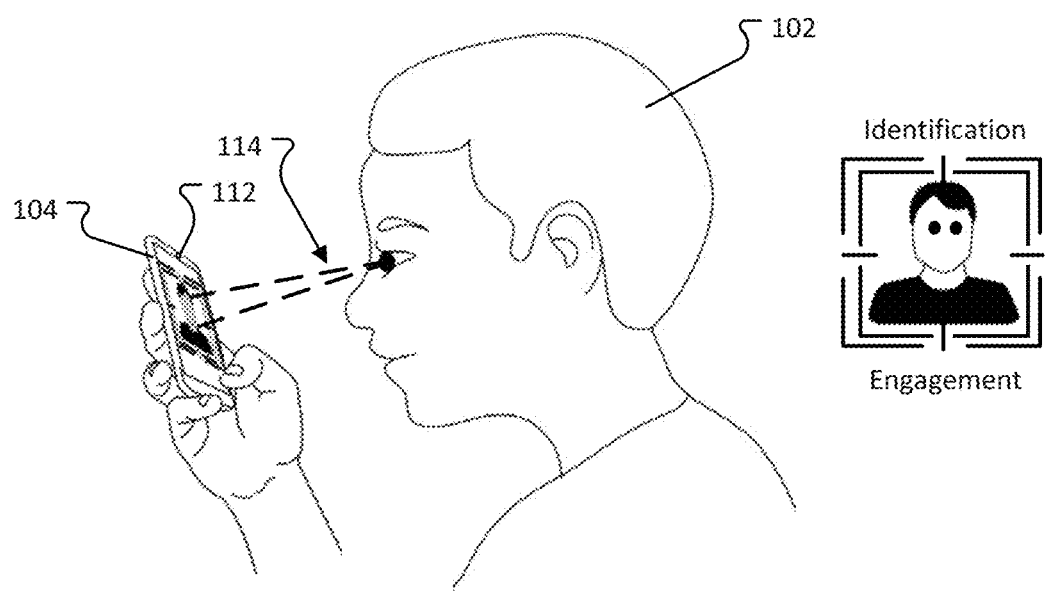

In accordance with examples of the present disclosure, FIG. 1A-1B depict an example of acquiring a user intent from a user's gaze and using such intent to control one or more functions and/or applications of the computing device. A user may be interacting with a computing system, such as but not limited to a mobile device, phone, or other computing system. In some examples, the computing system 104 may utilize a facial recognition system and/or a face-based authentication system to authenticate a user, such as the user 102, thereby allowing the user access to the computing system 104 and/or one or more capabilities provided by the computing system. In examples, the computing system 104 may include an image sensor having a field-of-view and capable of acquiring one or more images of the user 102, where the user may be included in the field-of-view of the image sensor 112. The image sensor 112 may be any image sensor capable of acquiring one or more images, where the one or more images may be an image derived from light of the infrared spectrum, the visible light spectrum, and/or or another light spectrum. The one or more images of the user 102 may be processed such that one or more features of the user, obtained from the one or more images, may be used as a basis for authenticating the user with the computing system 104 or another capability of the computing system 104. For example, the one or more images of the user 102 may be processed to identify the user and allow the user access to one or more applications or files stored on or otherwise accessible via the computing system 104. As another example, the one or more images of the user 102 may allow the user to login to the computing system 104, serve as an access credential, and/or prevent the mobile computing system from locking a display due, at least in part to, a lack of user interaction with the computing system 104. In some examples, the one or more images of the user may be processed at the computing system 104 and/or at a computing system or system accessible by the computing system 104. As another example, the one or more images of the user may be processed at the computing system 104 and one or more features of the user obtained from the one or more images may be provided to an access control system such that the access control system provides an indication to the computing system 104 that the user 102 is allowed to use or otherwise interact with the computing system 104.

In accordance with examples of the present disclosure, the image sensor 112 may obtain one or more images of the user 102, where the user 102 is within a field-of-view of the image sensor 112. The one or more images acquired by the image sensor 112 may be provided to a neural network model executing at a neural processing unit. The neural network model may determine and provide gaze information of the user 102 to one or more applications executing at the computing system 104 such than another function, for example a facial recognition system or other face-based authentication system, may be activated or otherwise enabled. Because the neural processing unit is specifically designed and/or programmed to process neural network tasks, the consumption of resources, such as power and/or computing cycles, is less than the consumption would be if a central processing unit were used. The gaze information determined and provided by the neural network model may include a gaze location of the user; the gaze location of the user may correspond to a location, such as an X, Y, Z coordinate, on and/or around the computing system 104. As depicted in FIG. 1A, the gaze information may indicate that the user is staring intently at an object, in a direction, and/or at a location that does not involve the computing system 104. For example, the user gaze 108 may be above the computing system 104. Accordingly, a facial recognition system or other face-based authentication system may not be activated. Accordingly, as depicted in FIG. 1A, no user engagement is detected according to a detected gaze of the user and therefore no identification occurs.

As depicted in FIG. 1B, the computing system 104 may determine that the user gaze 114 of the user 102 is directed to a portion of the computing system 104; based on this determination, the computing system may activate a facial recognition system or other face-based authentication system to unlock the computing system 104. Accordingly, as depicted in FIG. 1B, a user engagement is detected according to the user gaze and therefore an identification and/or authentication process may occur. In examples, the image sensor, such as the image sensor 112, may acquire one or more images of the user 102 and determine gaze information for the user. The one or more images acquired by the image sensor 112 may be provided to a neural network model and executing at a neural processing unit.

The neural network model may determine and provide the gaze information to one or more applications executing at the computing system 104 such than another function, for example a facial recognition system or other face-based authentication system may be activated or otherwise enabled. The gaze information determined and provided by the neural network model may include a gaze location of the user; the gaze location of the user may correspond to a location, such as an x, y, z coordinate, on and/or around the computing system 104. As an example, the gaze location of the user may correspond to a location on the display of the computing system 104 associated with a login prompt. Accordingly, until the gaze location of the user matches the location of the login prompt or other displayed control for example, the facial recognition system or other face-based authentication system may not be invoked, enabled, and/or activated. As depicted in FIG. 1B, the user gaze 114 is directed to a display of the computing system; in examples, when the gaze location of the user matches the location of the login prompt or other displayed control, the facial recognition system or other face-based authentication system may be invoked, enabled, and/or activated.

FIGS. 2A-2D depict another example of using a user gaze to control one or more functions of a computing system in accordance with examples of the present disclosure. In examples, the user gaze may control a brightness functionality of the computing system. For example, a maps application may be executed at the computing system. In some maps applications, when the maps application is providing directions, a computing system display may be maintained at a constant brightness such that the directions provided by the maps application are always immediately viewable by the user. However, maintaining the computing system display at a constant brightness may lead to excessive power utilization by the computing system and therefore cause a battery associated with the computing system to discharge. Accordingly, some maps application may dim the computing system display after a certain amount of time has passed. In examples, the dimming of the computing system display may be initiated by the maps application or may be initiated by an operating system of the computing system when a threshold amount of time has passed without user interaction. Accordingly, a user wishing to view directions provided by the maps application may need to tap the computing system or otherwise interact with the computing system in order to return the brightness of the computing system display to a level at which the user can view the directions. Requiring the user to interact with the computing system in order to view the directions for example, may cause the attention of the user to be directed off of or otherwise away from an immediate task of driving.

Figure 2A:
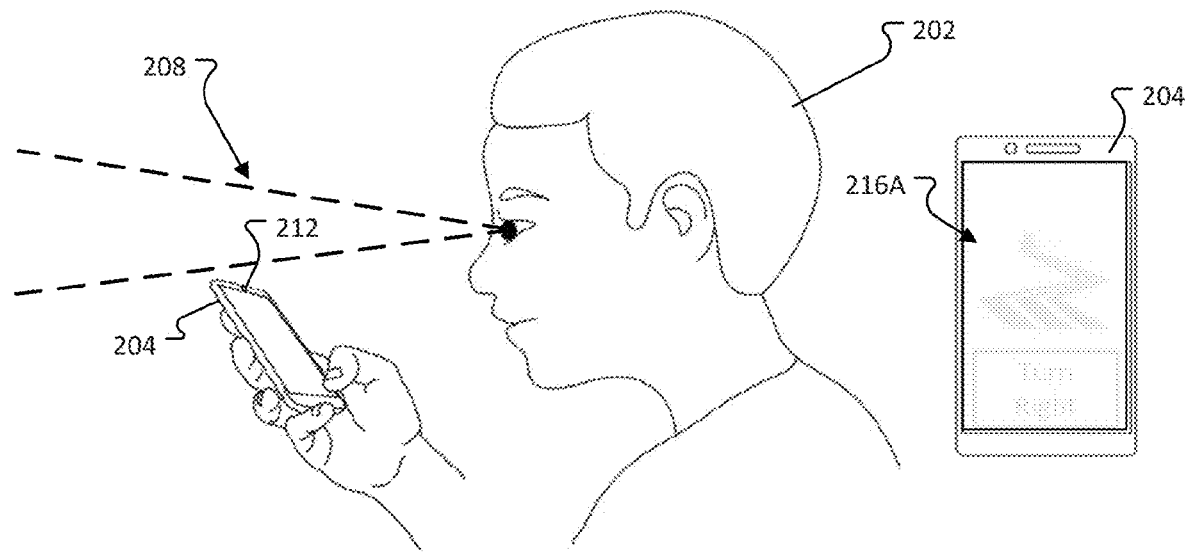
FIGS. 2A-2D depict another example of using a user gaze to control one or more functions of a computing system in accordance with examples of the present disclosure.

In accordance with examples of the present disclosure, the user gaze may be utilized to control the brightness of the computing system display 216A. As depicted in FIG. 2A, the image sensor 212 of the computing system 204 may obtain one or more images of the user 202, where the user 202 is within a field-of-view of the image sensor 212. The computing system 204 may be the same as or similar to the computing system 104 previously described; the image sensor 212 may be the same as or similar to the image sensor 112 previously described. The one or more images acquired by the image sensor 212 may be provided to a neural network model executing at a neural processing unit. The neural network model may determine and provide gaze information of the user 202 to one or more applications, such as the maps application, executing at the computing system 204. In some examples, the neural network model may determine and provide gaze information of the user 202 to an operating system executing at the computing system 204. The gaze information determined and provided by the neural network model may include a gaze location of the user; the gaze location of the user may correspond to a location, such as an x, y, z coordinate, on and/or around the computing system 204. As depicted in FIG. 2A, the gaze information may indicate that the user is staring intently at an object, in a direction, and/or at a location that does not involve the computing system 204. For example, the user gaze 208 may be directed to an area above the computing system 204. Accordingly, the maps application and/or the operating system may dim the computing system display 216A or otherwise allow the computing system display 216A to dim in accordance with a timed event. Accordingly, as depicted in FIG. 2A, the computing system display 216A is dim or may be turned off when the user gaze 208 is not directed to the computing system 204 and/or the computing system display 216A.

Figure 2B:
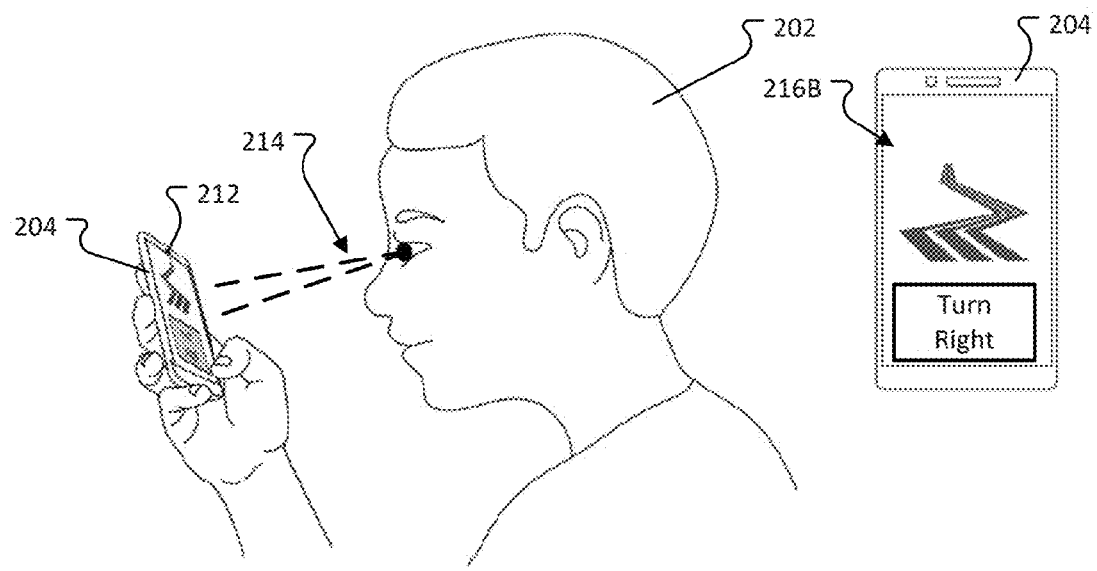

As depicted in FIG. 2B, the computing system 204 may determine that the gaze 214 of the user 202 is directed to a portion of the computing system 204; based on this determination, the computing system may cause the computing system display 216B to turn on and/or brighten. That is, the computing system display 216B may be brighter than the computing system display 216A. Accordingly, as depicted in FIG. 2B, the image sensor 212 may acquire one or more images of the user 202 and determine gaze information for the user. The one or more images acquired by the image sensor 212 may be provided to a neural network model and executing at a neural processing unit.

The neural network model may determine and provide gaze information of the user 202 to an operating system executing at the computing system 204 and/or to a maps application. The gaze information determined and provided by the neural network model may include a gaze location of the user; the gaze location of the user may correspond to a location, such as an x, y, z coordinate, on the computing system 204. As depicted in FIG. 2B, the gaze information may indicate that the user is staring intently at a portion of a display of the computing system 204. For example, the user gaze 208 may be directed to the map and/or directions of the maps application. Accordingly, the maps application and/or the operating system may cause the computing system display 216B to brighten based on the gaze information.

Figure 2C:
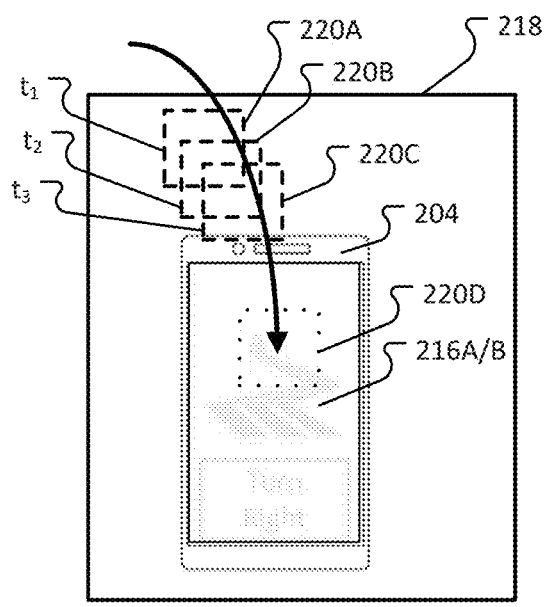
Figure 2D:
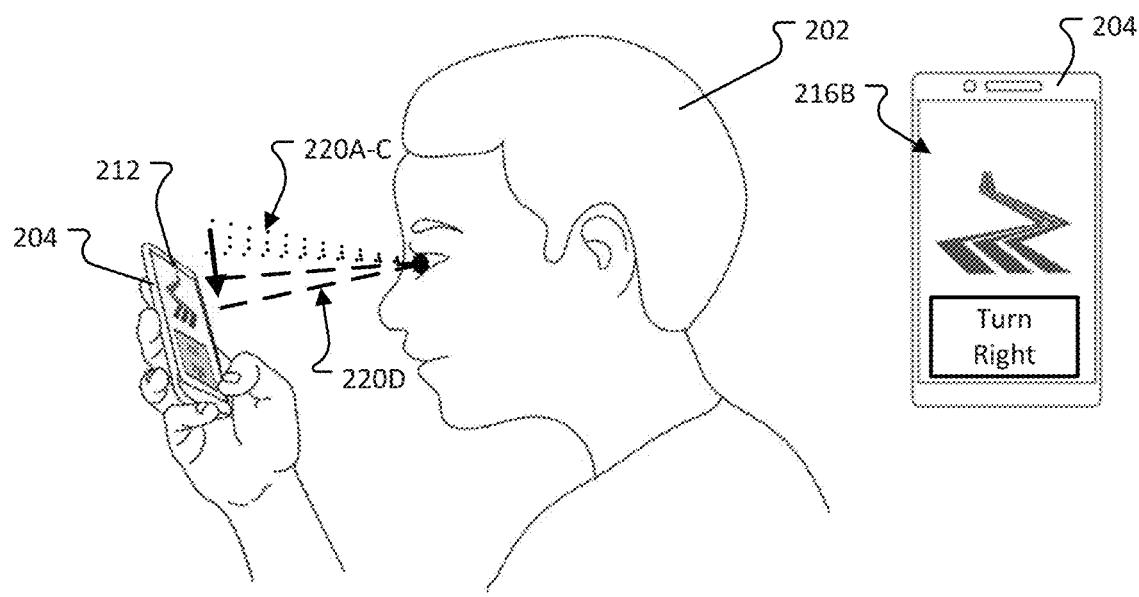

In some examples, a predicted user gaze may be utilized to control one or more functions and/or capabilities of a computing system. For example, one or more images acquired by the image sensor 212 may be provided to a neural network model. In examples, the one or more images may include a field-of-view that captures an area 218. Accordingly, the neural network model may determine that the gaze information for a user, such as user 202, includes a gaze location 220A corresponding to a first point in time $t_1$; a gaze location 220B corresponding to a second point in time $t_2$; and a gaze location 220C corresponding to a third point in time $t_3$. The neural network model may generate a predicted gaze location 220D based on the one or more of the previous gaze locations 220A, 220B, and/or 220C. Accordingly, the computing system 204 may cause the computing system display 216A to brighten based on the predicted gaze location 220D such that the computing system display 216B is in an "on" or otherwise bright state so that a user can view the content displayed to the computing system display 216B without having to wait for the neural network model to determine a gaze location that is on the computing system display 216A. As depicted in FIG. 2C, the gaze locations 220A, 220B, and/or 220C may be directed to locations on and/or around the computing system 204. As depicted in FIG. 2D, the predicted gaze location 220D may be directed to a location on the computing system display 216B causing the display to brighten. As previously mentioned, the application, such as the maps application, and/or an operating system of the computing system 204 may cause the computing system display 216B to turn on and/or brighten.

Figure 3A:
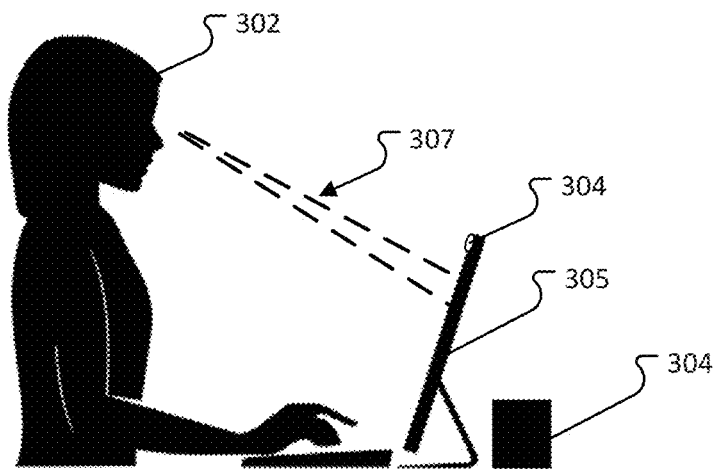
FIGS. 3A-3B depict another example of using a user gaze to control one or more functions of a computing system in accordance with examples of the present disclosure.
Figure 3B:
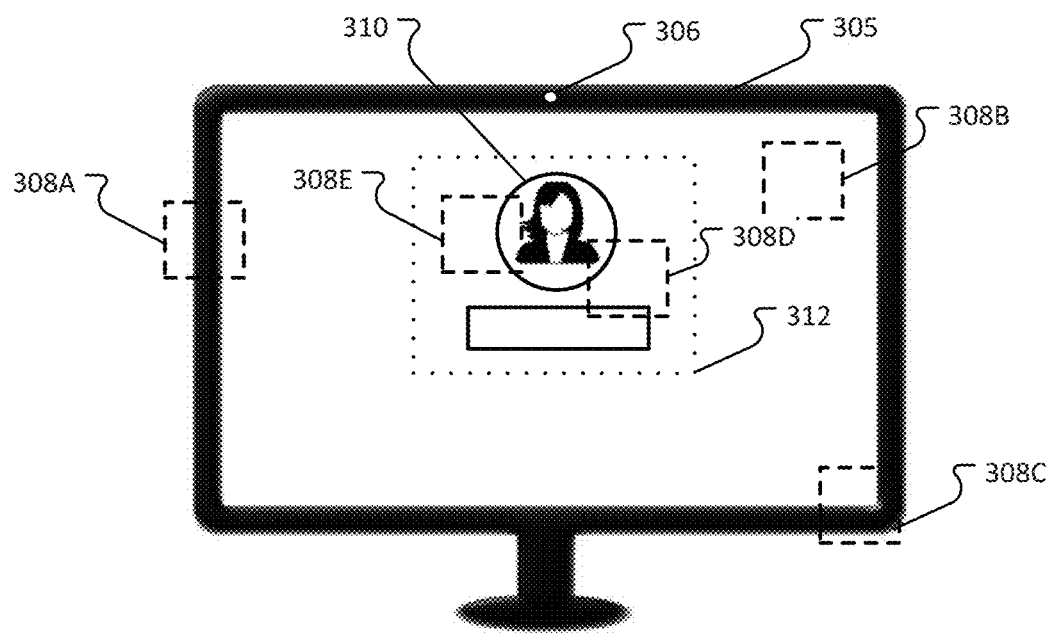

FIGS. 3A-3B depict another example of relying on user gaze to control one or more functions of a computing system in accordance with examples of the present disclosure. In examples, a user 302 may be working at a computing system 304 having one or more image sensors 306. The computing system 304 may be the same as or similar to the computing system 104 previously described; the image sensor 306 may be the same as or similar to the image sensor 112 previously described. In examples, the user gaze 307 may be directed to one or more locations 308A-D or areas on the display 305. A subsequent function, such as performing a facial recognition process or other face-based authentication process, may be dependent upon determining that the user 302 intends for the subsequent function, such as the facial recognition process or other face-based authentication process, to be enabled or otherwise activated. For example, a determined gaze location corresponding to locations 308A, 308B, and/or 308C may indicate that the user does not intend for a subsequent function to be executed. Accordingly, when the gaze location correspond to locations 308A, 308B, and/or 308C, a subsequent function, such as performing a facial recognition process or other face-based authentication process, may not be enabled or otherwise activated. However, when the gaze location correspond to gaze locations within an area or region 312 for example, the user may intend for the subsequent function, such as performing a facial recognition process or other face-based authentication process to be activated or otherwise enabled. As depicted in FIG. 3B, the gaze locations 308D and 308E are within the region 312; thus a subsequent function, such as performing a facial recognition process or other face-based authentication process, may be enabled or otherwise activated.

In examples, each of the gaze locations 308 may be determined by a neural network model as previously described. The region 312 may be application and/or operation system specific and/or may be defined by the user. While the example of FIGS. 3A-3B are directed to performing a facial recognition process or other face-based authentication process, it should be understood that that functions other than a facial recognition process or other face-based authentication process, are contemplated. For example, when a gaze location corresponding to any location on the display 305 is detected, an inactivity timeout of the operating system or other application may be reset. As one example, detecting a user gaze at location 308B may reset a timer associated with a screensaver and/or an auto-lock feature of the operating system executing on the computing system 304. Thus, for example, if the computing system 304 is not moving and/or a user is not physically engaging with the computing system 304, but a user is looking at the computing system 304, the computing system 304 will not lock the display. As another example, a display refresh rate, resolution, font size, and/or font smoothing settings may be controlled based on a gaze location and/or a gaze detection.

Figure 4A:
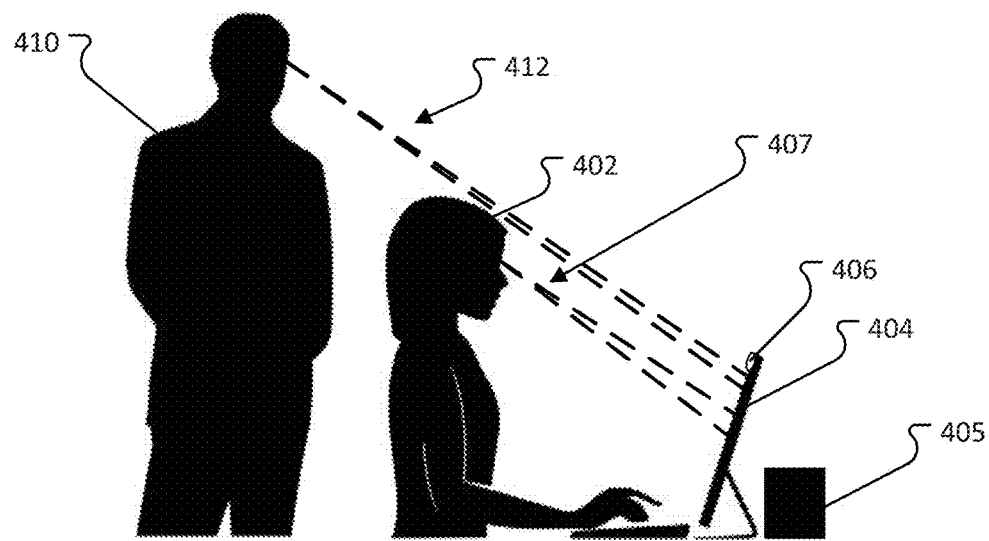
FIGS. 4A-4C depict another example of relying on user gaze to control one or more functions of a computing system in accordance with examples of the present disclosure.
Figure 4B:
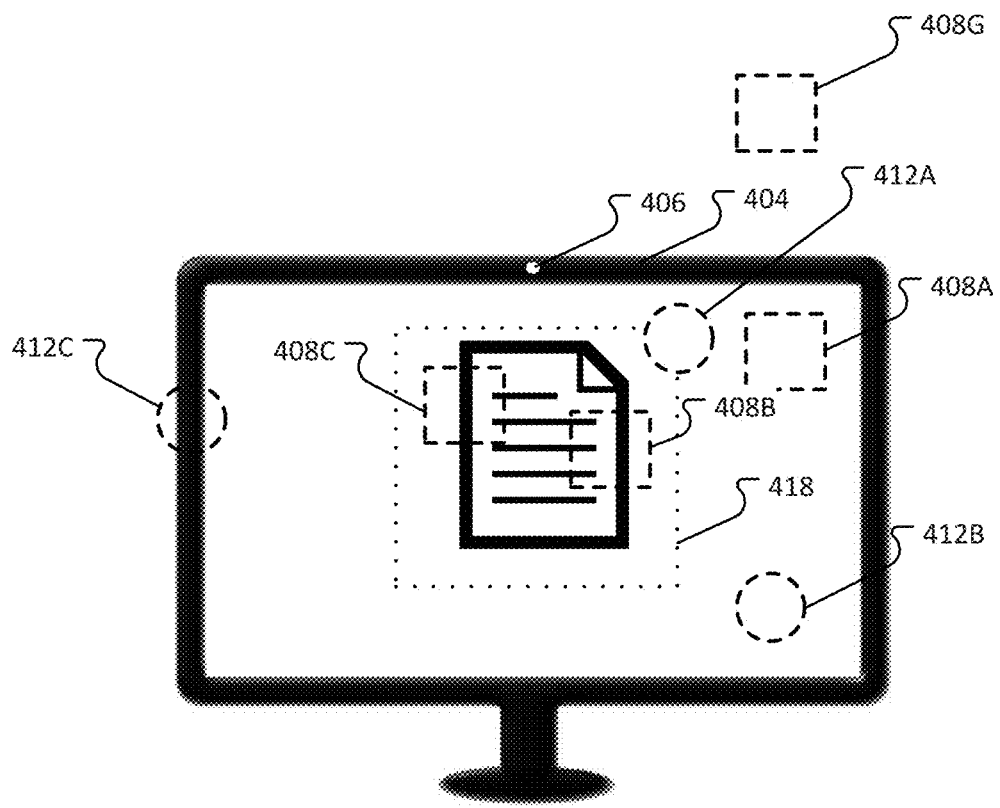
Figure 4C:
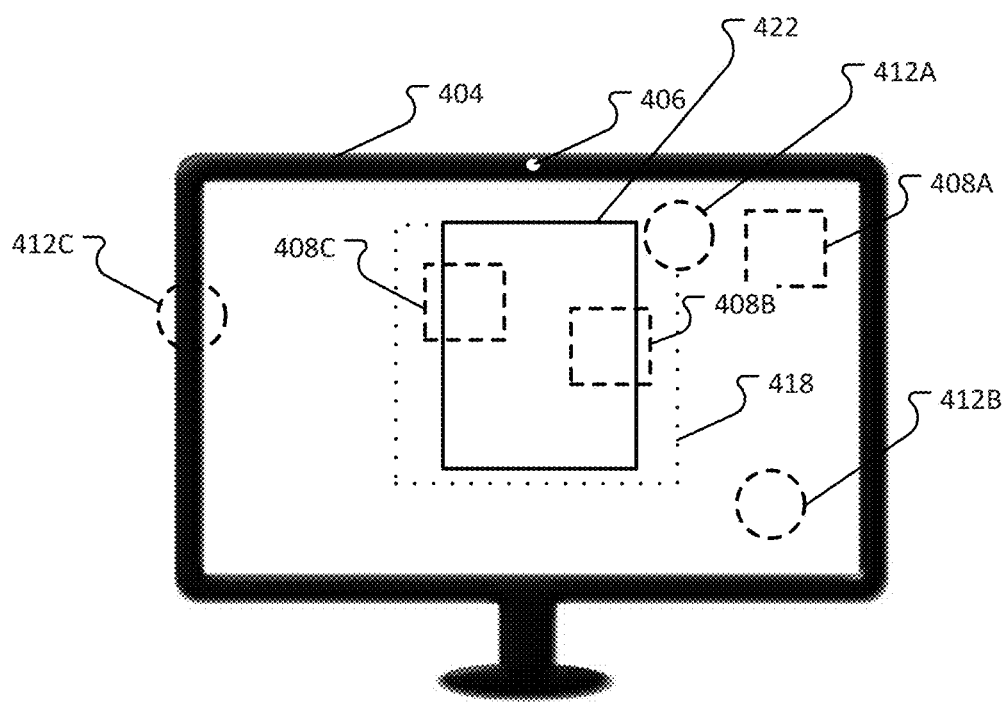

FIGS. 4A-4C depict another example of relying on user gaze to control one or more functions of a computing system in accordance with examples of the present disclosure. In examples, a user 402 may be working at a computing system 405 associated with a display 404, where the computing system 405 may be in communication with one or more image sensors 406. The computing system 405 may be the same as or similar to the computing system 104 previously described; the image sensor 406 may be the same as or similar to the image sensor 112 previously described. In examples, the user gaze 407 may be directed to one or more locations 408A-408C or areas on the display 404. The computing system 405 may track the user gaze 407 of the user and associate the user gaze 407 with an identity or unique identifier specific to the user 402. In examples, the computing system 405 may determine that the user gaze 407 strays from the display 404 for a period of time, for example the user gaze 407 of the user 402 is determined to be at location 408G for a period of time and then vanishes. The computing system 405 may cause the display to lock and/or dim when the period of time exceeding a threshold. Accordingly, although a second user 410 may be viewing the display 404, because the user 402 is determined to be absent, the computing system 405 may cause the display to lock such that the potentially unauthorized information is not obtained and/or unauthorized use of one or more applications does not occur.

As another example, the user 402 may be working at the computing system 405 associated with the display 404. A document or other content may be presented in a region 418 of the display 404. A user gaze 407 associated with the user 402 may be determined by a neural network model and associated with the user and/or a unique identifier as previously discussed. In examples, a second user 410 may attempt to view content, such as the content in the region 418, while the user 402 is viewing content. Accordingly, one or more images acquired by the image sensor 406 may be provided to a neural network model where the one or more images include portions of user 402 and second user 410. The neural network model may generate two types of gaze locations. A first type of gaze location may be a gaze location 408A-408D associated with the user 402; a second type of gaze location may be a gaze location 412 associated with the second user 410. In some examples, based on the determination that two or more gazes have been detected, the computing system 405 may cause the display 404 to lock or otherwise not display content.

In some examples, the computing system 405 may attempt to identify the second user 410 and perform an operation based on the identity of the second user 410. For example, the computing system 405 may initiate a facial recognition process or other face-based recognition system based on an indication from the neural network model that two or more gazes have been detected. In some examples, rather than lock the display 404 or otherwise hide content, the computing system 405 may determine whether the second user 410, or an account and/or identity associated with the second user 410, possesses rights to view content currently displayed, such as the content in the region 418. Upon determining that both the user 402 and the second user 410 are authorized or otherwise possess the appropriate privileges to view the content at the display 404 such as the content in the region 418, the computing system 405 may take no action regarding blocking, locking, or otherwise will not obstruct the content from being viewed by the second user 410. In some examples, the computing system may determine that both the user 402 and the second user 410 are authorized or otherwise possess the appropriate privileges to view the content at the display 404 when the gaze location 412 is directed to the displayed content or otherwise in a region 418. Accordingly, the computing system 405 may not perform the facial recognition and/or face-based authentication processes if a gaze location is at gaze location 412A and/or 412B. However, should the gaze location be on top of or otherwise at a specified region, such as the region 418, the computing system 405 may perform the facial recognition and/or face-based authentication processes to verify the second user 410 is authorized to view the displayed content.

In some examples, rather than lock or block all content displayed on a display 404 if the second user 410 is determined to not have the necessary access rights and/or privileges to view the displayed content in the region 418, only those files, documents, or content which the second user 410 is not authorized to view may be blocked or otherwise obstructed from view. As depicted in FIG. 4C, a obstructing block 422 may be overlaid or otherwise cover content in the region 418 thereby preventing the second user 410 from viewing the content in the region 418. In accordance with some examples, a subset of micro-pixels that correspond to an authenticated user's gaze may be illuminated; similarly, display backlighting, LEDs, and panels may be controlled based on an authenticated user's gaze.

Figure 5A:
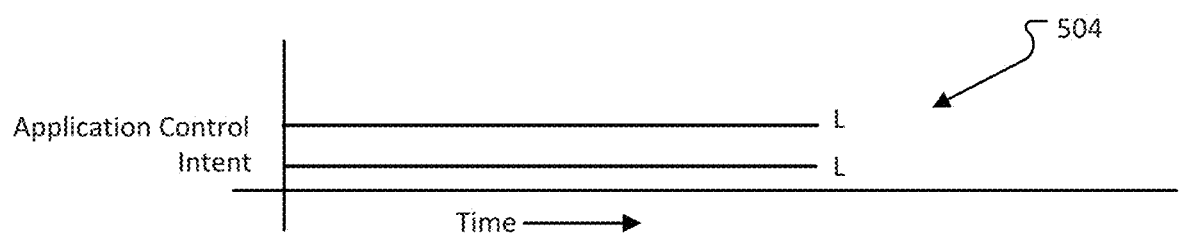
FIGS. 5A-5D depict signal diagrams associated with controlling one or more functions and/or applications of a computing system using eye gaze in accordance with examples of the present disclosure.
Figure 5B:
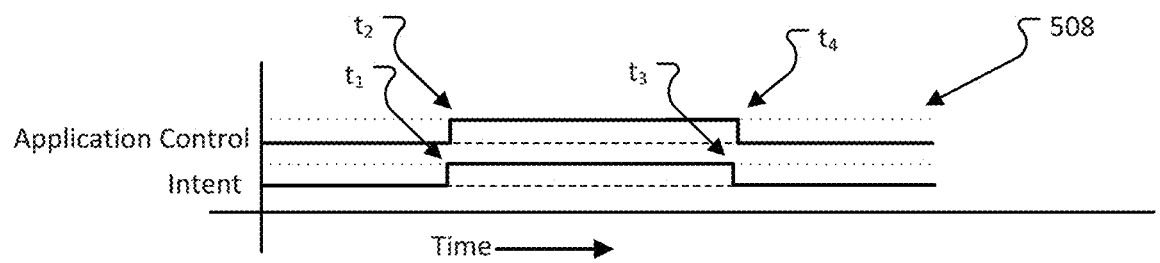

FIGS. 5A-5D depict signal diagrams associated with controlling one or more functions and/or applications of a computing system using eye gaze in accordance with examples of the present disclosure. As depicted in FIG. 5A, an intent of a user at a computing system may be based on a corresponding eye gaze location of a user. In examples, where an eye gaze location associated with a user is not at a display device or otherwise predicted to be at a display device, a user gaze may not be detected and therefore the intent of the user to interact with the display device may be expressed as a logic low as depicted in the signal diagram 504. Accordingly, a subsequent function, process, or application may not be enabled or otherwise invoked. Where an eye gaze location associated with a user is detected or otherwise determined to be at a display device at a first point in time $t_1$ or otherwise predicted to be at a display device at the first point in time $t_1$, the intent of the user to interact with the display device may be a logic high as depicted in the signal diagram 508. Accordingly, a subsequent function, process, or application may be enabled or otherwise invoked at a subsequent time $t_2$. In examples, the application control in the signal diagram 508 may correspond to increasing a brightness of the display, initiating a facial recognition process or other face-based authentication process, unlocking a computing system, granting access to a file, document, or otherwise, taking a picture, initiating or launching an application, etc. Where an eye gaze location associated with a user is at a display device at a first point in time $t_1$ or otherwise predicted to be at a display device at the first point in time $t_1$, and then is absent at a second point in time $t_3$, the intent of the user to interact with the display device may be a logic low as depicted in the signal diagram 508. Accordingly, a subsequent function, process, or application may be disabled or otherwise prevented from executing at a subsequent time $t_4$.

Figure 5C:
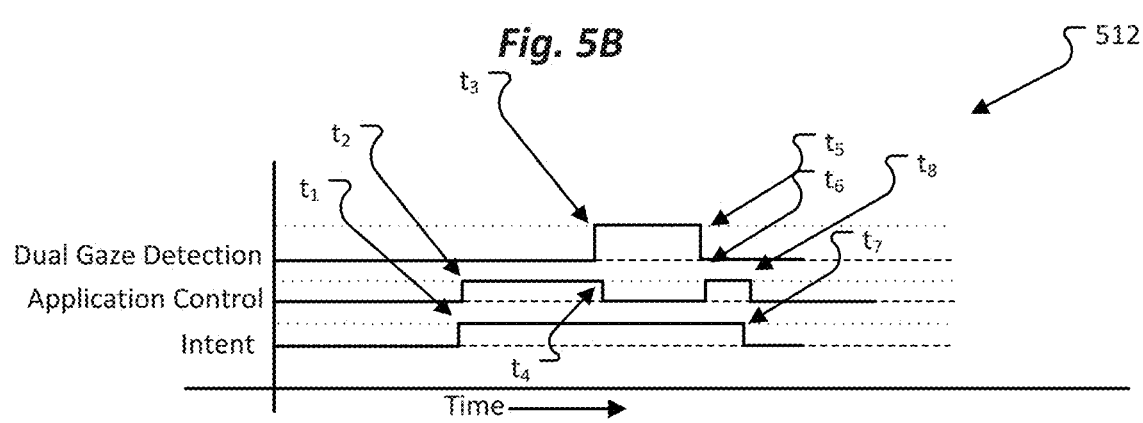

As depicted in FIG. 5C, a subsequent function, process, or application may be enabled or otherwise invoked at a subsequent time $t_4$. For example, an eye gaze location associated with a user may be detected or otherwise determined to be at a display device at a first point in time $t_1$ or otherwise predicted to be at a display device at the first point in time $t_1$; the intent of the user to interact with the display device may be a logic high as depicted in the signal diagram 512. Accordingly, a subsequent function, process, application, or state may be enabled or otherwise invoked at a subsequent time $t_2$. In examples, the application control in the signal diagram 512 may correspond to maintaining a login state of a user; maintaining a display enable state of a user, displaying content of a window, initiating a facial recognition process or other face-based authentication process, unlocking a computing system, granting access to a file, document, or otherwise, taking a picture, initiating or launching an application, etc. At a time $t_3$ in response to a gaze being detected of both first user and a second user, the enabled function, process, application, or state at $t_3$ may be disabled at $t_4$. For example, at a time $t_4$, corresponding to a dual gaze detection signal at a logic high and an action/state signal at a logic low, a display of computing device may be locked and/or content displayed at a computing device display may be obstructed with a graphically generated block for example.

In instances where the dual gaze detection is no longer detected, such as at $t_5$, the subsequent function, process, application, or state may be disabled or otherwise invoked at a subsequent time $t_6$. In examples, the application control in the signal diagram 512 again may correspond to maintaining a login state of a user; maintaining a display enable state of a user, displaying content of a window, initiating a facial recognition process or other face-based authentication process, unlocking a computing system, granting access to a file, document, or otherwise, taking a picture, initiating or launching an application, etc. Once the intent of the user is detected to be absent, for example at instances where the user leaves the field-of-view of an imaging device associated with the computing system, such as at time $t_6$, the enabled function, process, application, or state at $t_6$ may be disabled at $t_8$.

Figure 5D:
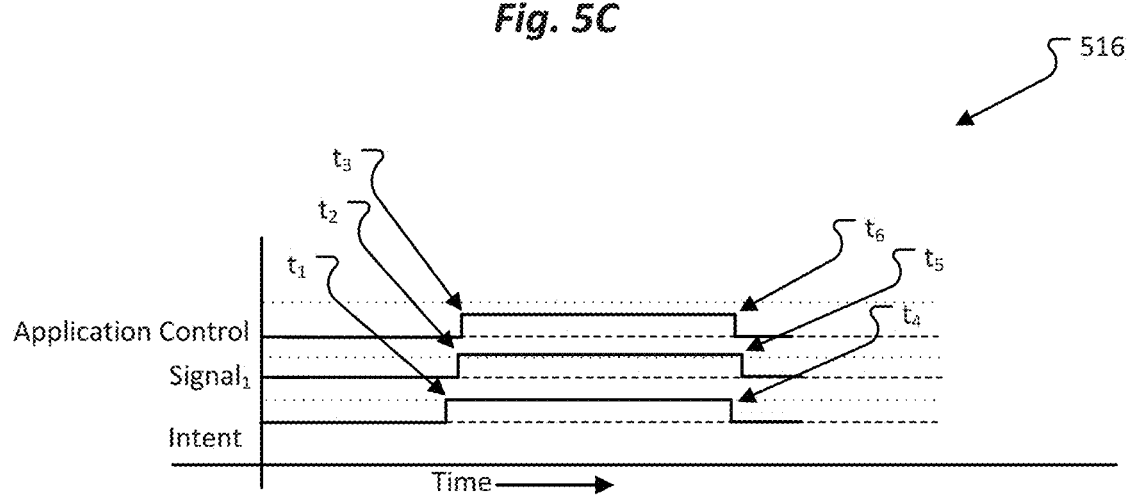

As depicted in FIG. 5D, a subsequent function, process, or application may be enabled or otherwise invoked based on an eye gaze location of a user indicating intent and another signal, such as $Signal_1$. For example, an eye gaze location associated with a user may be detected or otherwise determined to be at a display device at a first point in time $t_1$ or otherwise predicted to be at a display device at the first point in time $t_1$; the intent of the user to interact with the display device may be a logic high as depicted in the signal diagram 516. Accordingly, a signal, such as $Signal_1$ corresponding to another function, process, application, or state may be received at time $t_2$. In examples, receiving eye gaze information, such as intent, may cause a computing system to determine whether a signal, such as $Signal_1$ from another function, process, application, or state is received. For example, based on the intent signal of 516, a computing system may poll another state or signal, such as $Signal_1$. If a signal associated with the other function is received and is at a logic high, for example, at time $t_2$, a subsequent function, process, application, or state may be may be enabled or otherwise invoked at a subsequent time $t_3$. In examples, the application control in the signal diagram 516 may correspond to maintaining a login state of a user; maintaining a display enable state of a user, displaying content of a window, initiating a facial recognition process or other face-based authentication process, unlocking a computing system, granting access to a file, document, taking a picture, initiating or launching an application, etc, where the application control may be based on both an intent of a user based on eye gaze information and another signal, such as $Signal_1$. In some examples, the $Signal_1$ may correspond to non-gaze information, such as an image of a user used for identification and/or authentication purposes.

In examples, the application control signal may be associated with one or more applications or functions. For example, based on the gaze information (e.g., intent) and another signal, such as $Signal_1$, a function and/or application may be executed, enabled, disabled, or otherwise invoked. As one non-limiting example, a brightness of a computing system display may be increased in response to the gaze information (or predicted gaze information) (e.g., intent), and where $Signal_1$ corresponds to movement of a computing system, such as a smartphone. Accordingly, a brightness of an app, such as a maps application, may increase. In some examples, a face-based authentication or other facial recognition system may be invoked to log a user into a computing system. Based on a predicted gaze location based on the gaze information, a maps application may be enabled and/or a brightness associated with a display providing the maps application may be increased when the $Signal_1$ indicates a computing system is moving (e.g., in an automobile, moved by a user, etc.). Alternatively, or in addition, an interactivity timer, such as a countdown or watchdog timer associated with a computing system display may be reset such that a computing system is not locked or the computing system display is not turned off—where the resetting of the interactivity timer is based on the intent of the user and $Signal_1$, such as a computing system not moving.

As another example, a motion signal $Signal_1$ indicating that a computing system has not been moved or otherwise is being held in a "still" state together with gaze information of the user may indicate to the computing system that a photograph is to be acquired and added to a "quick shot" gallery to solve the "missed moment" situation where a user does not have enough time to frame the subject of a photograph due to a quickly changing environment. As another example, the computing system may classify a user's activity as a type of activity, such as but not limited to "running", "driving", etc. and output a detected activity as $Signal_1$. Thus, together with the detected signal, a user's gaze may be used to invoke an emergency call button rendered to the computing device display. Alternatively, or in addition, atypical device motions, such as motions passing between people may be detected; for example, the computing system may take photos of users preemptively and may provide assistance in use cases such as pick pocketing, muggings, accidents or other atypical situations. Thus, when a signal indicates the computing system is in motion, gaze information corresponding to a person to whom the computing system does not belong may be obtained.

In some examples, when an eye gaze location associated with a user is no longer received or otherwise determined to be at a location other than a computing system display, such as at a time $t_4$, the application control may enter a logic low state at time $t_6$, even though the $Signal_1$ may be at a logic high (e.g., at $t_5$). Accordingly, the application associated with the application control signal may be disabled for example, or enter another state.

Figure 6:
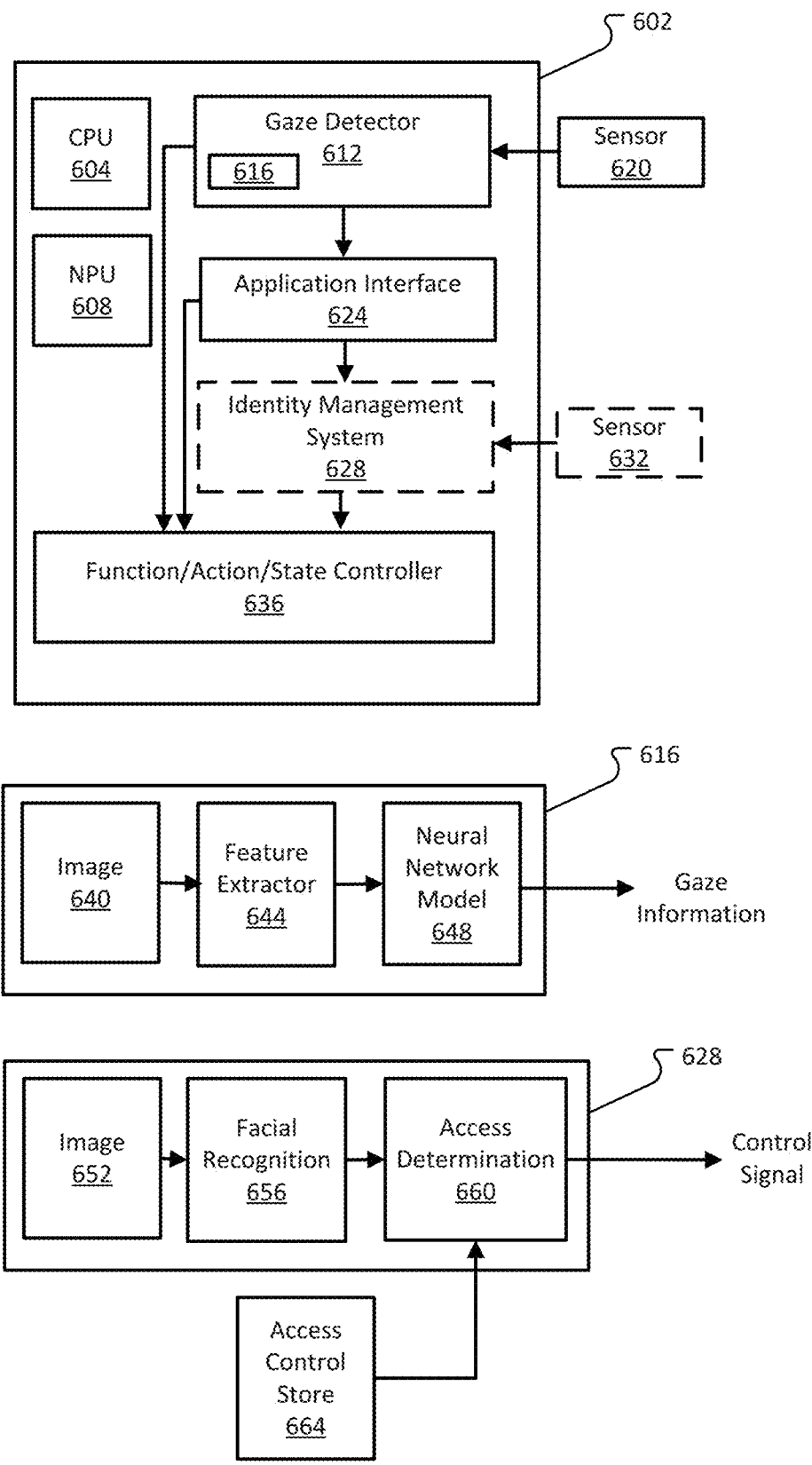
FIG. 6 depicts additional details of a computing system associated with controlling one or more functions and/or applications using eye gaze in accordance with examples of the present disclosure.

FIG. 6 depicts additional details of a computing system 602. The computing system 602 may be the same as or similar to the computing system 104 previously described. The computing system 602 may include a central processing unit (CPU) 604, a neural processing unit (NPU) 608, a gaze detector 612 and a function/action/state controller 636. In examples, the computing system 602 may include an application interface 624 and/or optionally an identity management system 628. In addition, the computing system 602 may include or otherwise be communication with an image sensor 620 and optionally an image sensor 632. The gaze detector 612 may include a gaze estimator 616.

In examples, the computing system 602 may receive one or more images from the image sensor 620. In some examples, the gaze detector 612 may execute processing at the CPU 604 and/or the NPU 608. For example, processing of the gaze estimator 616 may occur at the NPU 608. The NPU 608, being configured to efficiently execute processing associated with neural network models, such as the gaze estimator 616, may allow the gaze detector 612 to operate in or near real-time such that a gaze of a user may be detected in or near real-time without consuming resources traditionally expended by the CPU 604. Accordingly, the gaze detector 612 may receive the one or more images 640 from the image sensor 620. The gaze estimator 616 may take the received one or more images 640, and extract one or more features from the image 640 using the feature extractor 644. For example the feature extractor 644 may determine and/or detect a user's face and extract feature information such as, but not limited to, a location of a user's, eyes, pupils, nose, chin, ears etc. In examples, the extracted information may be provided to a neural network model 648, where the neural network model may provide gaze information as an output. In examples, the neural network model may include but is not limited to a transformer model, a convolutional neural network model, and/or a support vector machine model. The gaze information output from the neural network model may be provided to an application interface 624 where an application associated with the application interface 624 may utilize the gaze information to determine a function to execute, and/or enabled, disable, or otherwise invoke a function. For example, the gaze information may include coordinates, (e.g., x,y,z coordinates) of a user's gaze in relation to an origin point on a display associated with a computing device. The application associated with the application interface 624 may then determine a function or application to invoke, enable, or execute, and then invoke, enable, or execute the function.

As another example, based on the gaze information, a maps application may be enabled and/or a brightness associated with a display providing the maps application may be increased. In some examples, the gaze information may include a signal indicating a user's intent. In examples the gaze information may be provided to a function/action/state controller 636 which may determine a function or application to invoke, enable, or execute, and then invoke, enable, or execute the function. For example, based on the gaze information, a maps application may be enabled and/or a brightness associated with a display providing the maps application may be increased.

In examples, the determination of gaze information may occur over one or more images. For example, a user's gaze may be detected and then confirmed when a gaze of the user determined for a satisfactory number of images occurs. For example, to account for natural user eye movement, a gaze of a user may be determined over multiple images, where a confirmation of a user's gaze occurs when the determined gaze for each image of the multiple images, or a subset of images of the multiple images, is directed to approximately the same location. That is, a user gaze may be based on a gaze in each image, or a subset of images, acquired during the span of 1.8 seconds for example, that is directed to the same location. Of course other time spans and/or number of images are contemplated. In addition, the number images and/or the time span necessary to determine a gaze of a user may be dependent on a function and/or application that is invoked, enabled, or otherwise executed. For example, launching an application based on a user's gaze may require a user to gaze at an icon for 1.8 seconds while preventing a display from going dim may require a user to gaze at the display for 0.9 seconds.

In some examples, an identity management system 628 may be invoked based on the gaze information. For example, an image 652 may be provided by the image sensor 632; the image may be the same as or different from the image 640. In examples, the image sensor 620 and the image sensor 632 may be the same image sensors, or may be different. The image 652 may be provided to a facial recognition process 656 which may perform one or more facial recognition routines to determine whether a user associated with the image 652 should be granted access to a specific application or function. As an example, the identity management system 628 may be utilized to authenticate a user or otherwise log a user into a computing system utilizing facial recognition. Accordingly, the identity management system 628 may communicate with an access control store 664; the access control store may include access credentials for a user. In some examples, the access control store 664 may include information indicating what document a user has access credentials to view or the like.

Figure 7:
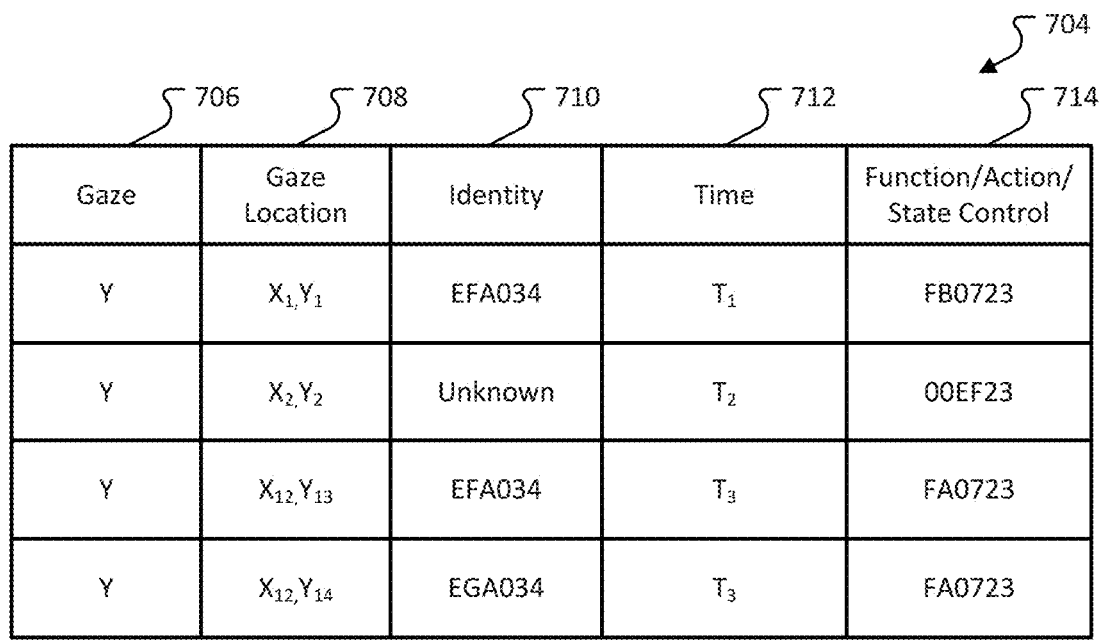
FIG. 7 depicts example data structures in accordance with examples of the present disclosure.
Figure 7:
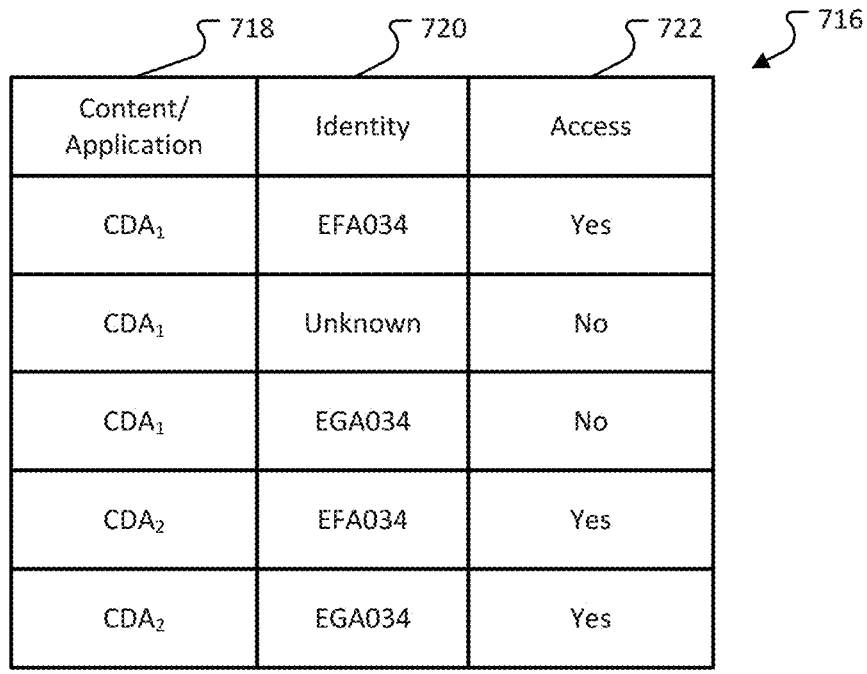

FIG. 7 depicts example data structures 704 and 716 in accordance with examples of the present disclosure. The data structure 704 may associate a gaze 706 of a user with a gaze location 708, identity of the user 710, a time at which point the gaze was detected 712, and a corresponding function/action/state control 714. For example, a first gaze at time $T_1$ may correspond to a gaze location $X_1,Y_1$ and initiate a function, action, or control having an identifier of FB0723 which may correspond to increasing the brightness of an application, such as a maps application, displayed at a computing device display. As another example, at time T2, another gaze associated with a different user may be detected, which may initiate a function, action, or control having an identifier of 00EF23 corresponding to locking a display of a device.

The data structure 716 is an example data structure associating content or an application 718 to an identity 720 of a user and whether a user has access to view such content. For example, a content identifier $CDA_1$ may refer to a first application or view of content displayed to a computing system display. In examples, a user associated with an identity EFA034 may possess access credentials to view such content such that the content is displayed at a computing system display. In examples, a user associated with an ID EGA034 may not have access credentials to view such content; accordingly, if a gaze associated with a user identity of EGA034 is detected, the content $CDA_1$ will not be displayed to a computing system display. For example, a computing system may enter a locked state such that a login screen is depicted at the computing system display. In another example, content $CDA_1$ is obscured or otherwise blocked from being viewable—for example, content is blurred, covered with other content or a graphic, and/or an application window displaying such content is minimized or closed.

Figure 8:
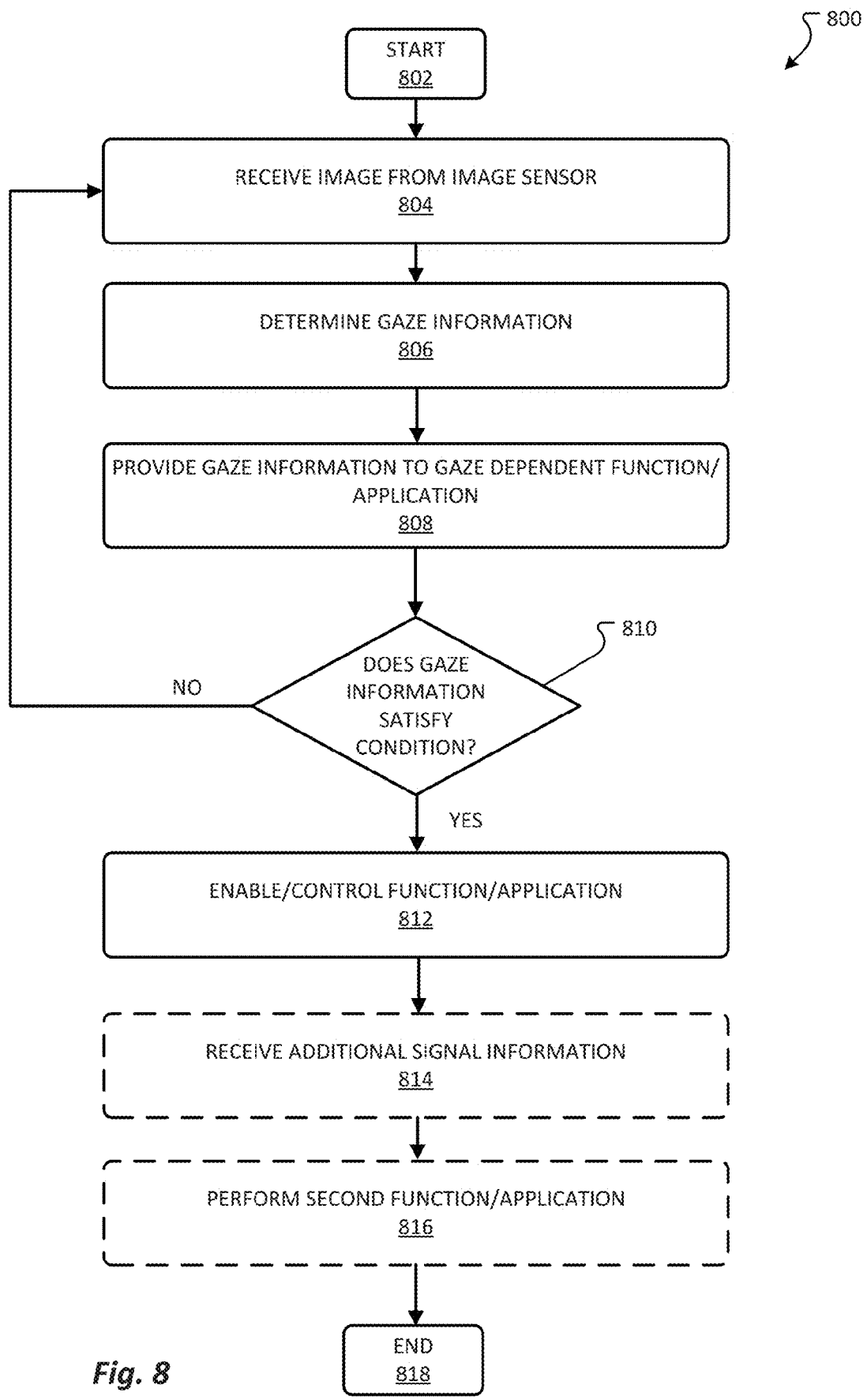
FIG. 8 depicts details of a method for controlling a function and/or application using a detected gaze of a user in accordance with examples of the present disclosure.

FIG. 8 depicts details of a method 800 for controlling a function and/or application using a detected gaze of a user in accordance with examples of the present disclosure. A general order for the steps of the method 800 is shown in FIG. 8. Generally, the method 800 starts at 802 and ends at 818. The method 800 may include more or fewer steps or may arrange the order of the steps differently than those shown in FIG. 8. The method 800 can be executed as a set of computer-executable instructions executed by a computer system and encoded or stored on a computer readable medium. In examples, aspects of the method 800 are performed by one or more processing devices, such as a computer or server. Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method starts at 802, where flow may proceed to 804. At 804, an image is received from an image sensor. The image sensor may be the same as or similar to the image sensor 112 previously described. The method may proceed to 806 and gaze information may be determined. In examples, the gaze information may include an enable/disable signal or may include a location of a user's gaze. For example, the gaze information may include a coordination location (e.g., X,Y,Z) in relation to an origin point on a display associated with a computing device indicating a location of a user's gaze or a predicted location of a user's gaze. In examples, a gaze estimator, such as a gaze estimator 616, may receive the image and extract one or more features from the image using a feature extractor, such as the feature extractor 644. The feature extractor may extract feature information such as, but not limited to, a location of a user's, eyes, pupils, nose, chin, ears etc. In examples, the extracted information may be provided to a neural network model, such as the neural network model 648, where the neural network model may generate the gaze information.

The method 800 may proceed to 808 where the gaze information may be provided to a gaze dependent function and/or application. For example, the gaze information may be provided to an application interface, such as the application interface 624. An application associated with the application interface may utilize the gaze information to determine a function and/or application to execute, enable, disable, or otherwise invoke. In some examples, the gaze information may be provided directly to a function or application. Alternatively, or in addition, the gaze information may be provided to the application interface such that the application interface may determine the function and/or application to execute, enable, disable, or otherwise invoke.

The method 800 may proceed to 810, where a determination may be made based on whether the gaze information satisfies a condition. In examples, the gaze information may satisfy a condition if the gaze information corresponds to a signal going from an logic low to a logic high and/or vice versa. In some examples, the gaze information may correspond to a location associated with or otherwise directed to a location on a computing system display; if the gaze location coincides with another location, such as a login prompt, a location on a displayed app, a location on the computing system display, then the method 800 may proceed to 812. In some examples, the gaze information may be generated for a predicted gaze location associated with or otherwise directed to a location on a computing system display; if the predicted gaze location coincides with another location, such as a login prompt, a location on a displayed app, a location on the computing system display, then the method 800 may proceed to 812. In some examples, where the gaze information does not satisfy a condition, the flow of the method may return to 804.

At 812, the method may enable and/or control a function or application. For example, based on the gaze information satisfying a condition, the determined function and/or application to execute, enable, disable, or otherwise invoke may be executed, enabled, disabled, or otherwise invoked. As one non-limiting example, a brightness of a computing system display may be increased in response to the gaze information (or predicted gaze information). Accordingly, a brightness of an app, such as a maps application, may increase. In some examples, a face-based authentication or other facial recognition system may be invoked to log a user into a computing system. At 810, based on the gaze information and/or the predicted gaze information, a maps application may be enabled and/or a brightness associated with a display providing the maps application may be increased. In some examples, the gaze information may include a signal indicating a user's intent. In examples the gaze information may be provided to a function/action/state controller 636 which may determine a function or application to invoke, enable, or execute, and then invoke, enable, or execute the function based on the signal and/or intent. For example, an interactivity timer, such as a countdown or watchdog timer associated with a computing system display may be reset such that a computing system is not locked or the computing system display is not turned off. As another example, based on the gaze information, a computing system may invoke a photograph capture process to take a photograph as intended by the a user, rather than requiring the user to navigate or more graphical user interfaces to take a photograph.

The method may optionally proceed to 814, where one or more additional signals may be received such that a second function or application may be executed at 816. For example, a motion signal indicating that a computing system has not been moved or otherwise is being held in a "still" state together with gaze information of the user may indicate to the computing system that a photograph is to be acquired and added to a "quick shot" gallery to solve the "missed moment" situation where a user does not have enough time to frame the subject of a photograph due to a quickly changing environment. As another example, the computing system may classify a user's activity as a type of activity, such as but not limited to "running", "driving", etc. In some examples, a user's gaze may be used to invoke an emergency call button rendered to the computing device display based on the detected activity. Alternatively, or in addition, atypical device motions, such as motions of the computing device passing between people, may be used to trigger the taking of photos of users preemptively to provide assistance in use cases such as pick pocketing, muggings, accidents or other atypical situations. For example, when a signal indicates the computing system is in motion, the gaze detector may obtain and store gaze information corresponding to a person to whom the computing system does not belong. The method 800 may end at 818.

Figure 9:
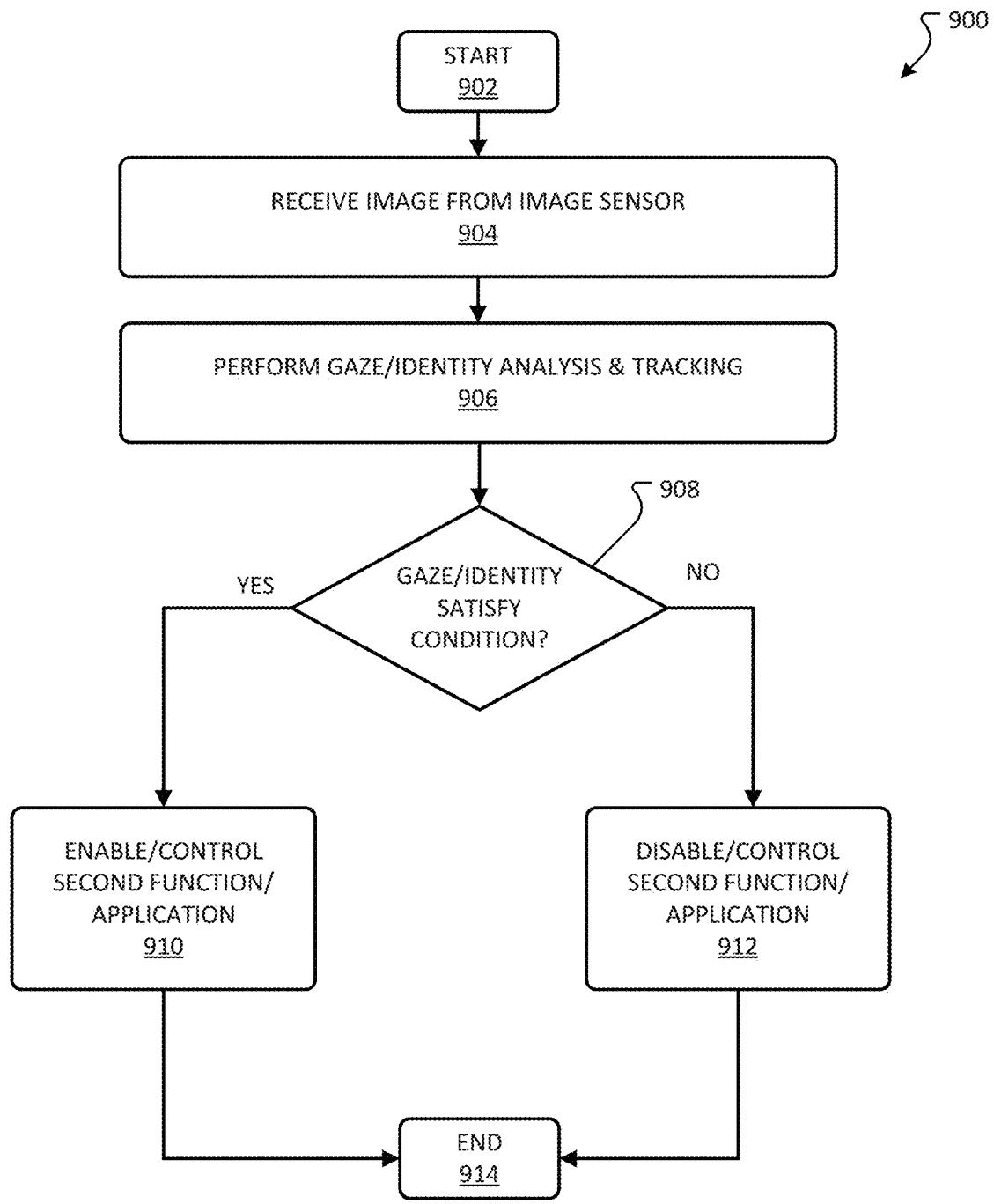
FIG. 9 depicts details of a method for controlling a function and/or application using a detected gaze of an identified user in accordance with examples of the present disclosure.

FIG. 9 depicts details of a method 900 for controlling a function and/or application using a detected gaze of an identified user in accordance with examples of the present disclosure. A general order for the steps of the method 900 is shown in FIG. 9. Generally, the method 900 starts at 902 and ends at 914 The method 900 may include more or fewer steps or may arrange the order of the steps differently than those shown in FIG. 9. The method 900 can be executed as a set of computer-executable instructions executed by a computer system and encoded or stored on a computer readable medium. In examples, aspects of the method 900 are performed by one or more processing devices, such as a computer or server. Further, the method 900 can be performed by gates or circuits associated with a processor, Application Specific Integrated Circuit (ASIC), a field programmable gate array (FPGA), a system on chip (SOC), a neural processing unit, or other hardware device. Hereinafter, the method 900 shall be explained with reference to the systems, components, modules, software, data structures, user interfaces, etc. described in conjunction with FIGS. 1-8.

The method starts at 902, where flow may proceed to 904. At 904, an image is received from an image sensor. The image sensor may be the same as or similar to the image sensor 112 previously described. The method may proceed to 906 and gaze information may be determined. In examples, the gaze information may include an enable/disable signal or may include a location of a user's gaze. For example, the gaze information may include a coordination location (e.g., X,Y,Z) in relation to an origin point on a display associated with a computing device indicating a location of a user's gaze or a predicted location of a user's gaze. In examples, a gaze estimator, such as a gaze estimator 616, may receive the image and extract one or more features from the image using a feature extractor, such as the feature extractor 644. The feature extractor may extract feature information such as, but not limited to, a location of a user's, eyes, pupils, nose, chin, ears etc. In examples, the extracted information may be provided to a neural network model, such as the neural network model 648, where the neural network model may generate the gaze information. In addition, an identity may be assigned to the generated gaze information.

For example, an identity management system may be invoked based on the gaze information such that a facial recognition process may perform one or more facial recognition routines to determine whether a user associated with the gaze information should be granted access to a specific application or function. That is, an identity of a user may be assigned to gaze information. The method may proceed to 908 where a determination may be made as to whether the gaze information and/or the identity associated with the gaze satisfies a condition. Thus, in instances where the gaze information and/or the identity satisfy a condition, the method may proceed to 910; alternatively, the method may proceed to 912. As an example, gaze location of a user may be directed to content that is access controlled but is displayed at a computing system display; accordingly, if the identity of the user is associated with the proper access credentials, the method may proceed to 910 for example, where the access controlled content may be displayed or may continue to be displayed. However, if the identity of the user is not associated with the proper access credentials, the method may proceed to 912 where a second function, such as the display of the access controlled content may be disabled (e.g., the computing system may enter a locked state such that information is not displayed).

As another example, the method 900 may operate according to a timed event, such that the gaze information associated with a user is checked to ensure temporal consistency. That is, instances where a first user is using a computing system and leaves the computing system unlocked and unattended, the method 900 may be executed and determine that new gaze information is now associate with a different user. Accordingly, at 910 and/or 912, the display of content may be blocked, restricted, and/or in some instances enabled based on the identity of the user.

Figure 10:
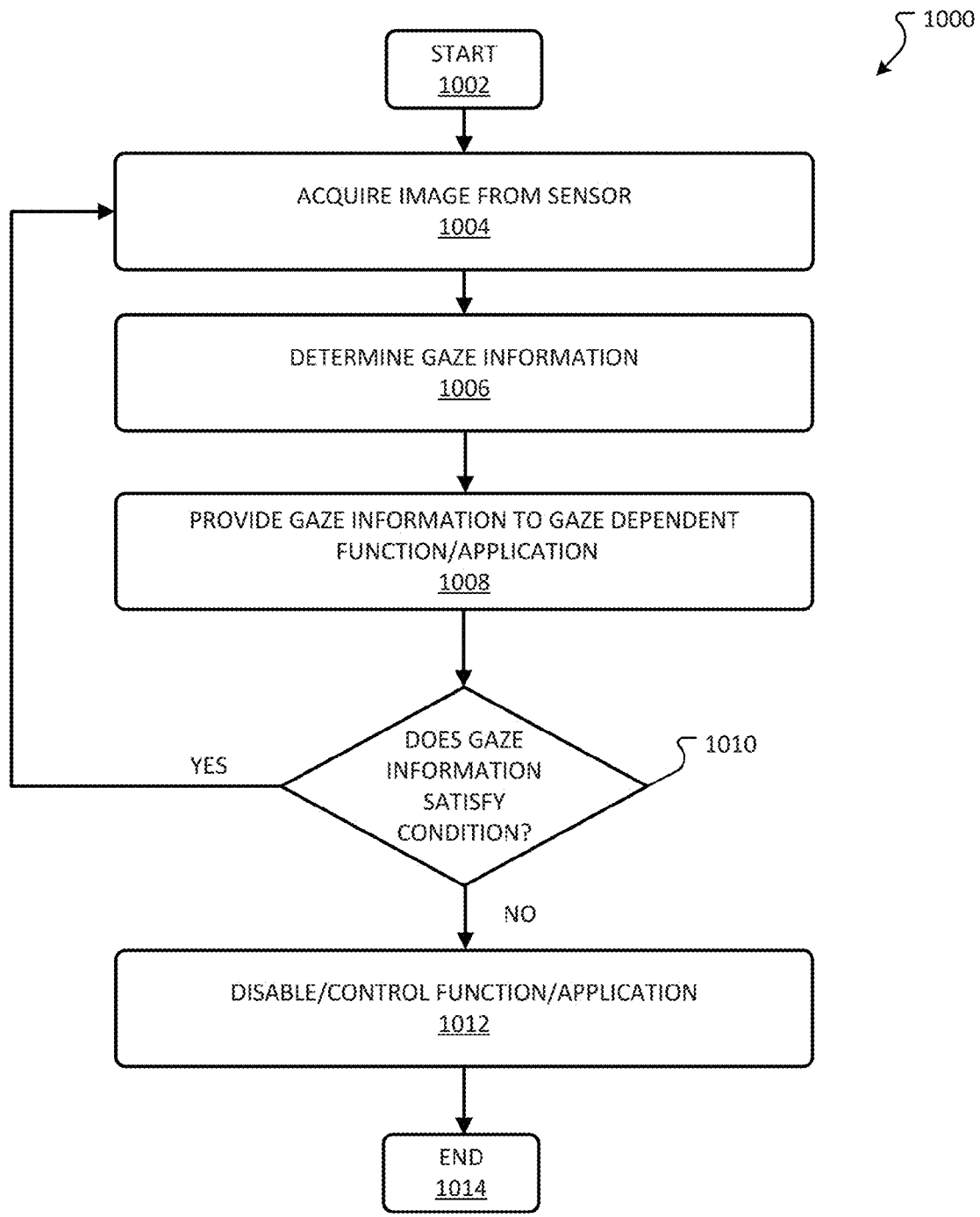
FIG. 10 depicts details of a method for controlling a function and/or application using a detected gaze of a user in accordance with examples of the present disclosure.

FIG. 10 depicts details of a method 1000 for controlling a function and/or application using a detected gaze of a user in accordance with examples of the present disclosure. A general order for the steps of the method 1000 is shown in FIG. 10. Generally, the method 1000 starts at 1002 and ends at 1014. The method 1000 may include more or fewer steps or may arrange the order of the steps differently than those shown in FIG. 10. The method 1000 can be executed as a set of computer-executable instructions executed by a computer system and encoded or stored on a computer readable medium. In examples, aspects of the method 1000 are performed by one or more processing devices, such as a computer or server. Further, the method 1000 can be performed by gates or circuits associated with a processor, Application Specific Integrated Circuit (ASIC), a field programmable gate array (FPGA), a system on chip (SOC), a neural processing unit, or other hardware device. Hereinafter, the method 1000 shall be explained with reference to the systems, components, modules, software, data structures, user interfaces, etc. described in conjunction with FIGS. 1-9.

The method starts at 1002, where flow may proceed to 1004. At 1004, an image is received from an image sensor. The image sensor may be the same as or similar to the image sensor 112 previously described. The method may proceed to 1006 and gaze information may be determined. In examples, the gaze information may include an enable/disable signal or may include a location of a user's gaze. For example, the gaze information may include a coordination location (e.g., X,Y,Z) in relation to an origin point on a display associated with a computing device indicating a location of a user's gaze or a predicted location of a user's gaze. In examples, a gaze estimator, such as a gaze estimator 616, may receive the image and extract one or more features from the image using a feature extractor, such as the feature extractor 644. The feature extractor may extract feature information such as, but not limited to, a location of a user's, eyes, pupils, nose, chin, ears etc. In examples, the extracted information may be provided to a neural network model, such as the neural network model 648, where the neural network model may generate the gaze information.

The method 1000 may proceed to 1008 where the gaze information may be provided to a gaze dependent function and/or application. For example, the gaze information may be provided to an application interface, such as the application interface 624. An application associated with the application interface may utilize the gaze information to determine a function and/or application to execute, enable, disable, or otherwise invoke. In some examples, the gaze information may be provided directly to a function or application. Alternatively, or in addition, the gaze information may be provided to the application interface such that the application interface may determine the function and/or application to execute, enable, disable, or otherwise invoke.

The method 1000 may proceed to 1010, where a determination may be made based on whether the gaze information satisfies a condition. In examples, the gaze information may satisfy a condition if the gaze information corresponds to a signal going from an logic high to a logic low and/or vice versa. In some examples, the gaze information may correspond to a location associated with or otherwise directed to a location on a computing system display or at a location other than the computing system display. If the gaze location coincides with another location that is not the computing system display, then the method 1000 may proceed to 1012. In some examples, the gaze information may be generated for a predicted gaze location associated with or otherwise directed to a location on a computing system display; if the predicted gaze location coincides with another location that is not directed to the computing system display, then the method 1000 may proceed to 1012. In some examples, where the gaze information does satisfy a condition, the flow of the method may return to 1004.

At 1012, the method may disable and/or prevent the execution of a function or application. For example, based on the gaze information not satisfying a condition (e.g., a user is looking away from the computing system display), a function and/or application may be disabled, or otherwise prevented from executing. As one non-limiting example, a brightness of a computing system display may be decreased in response to the gaze information (or predicted gaze information) not coinciding with the computing system display. Accordingly, a brightness of an app, such as a maps application, may be decreased. In some examples, a face-based authentication or other facial recognition system may be invoked to record or log a user to whom the gaze belongs. The method 1000 may end at 1018.

Figure 11:
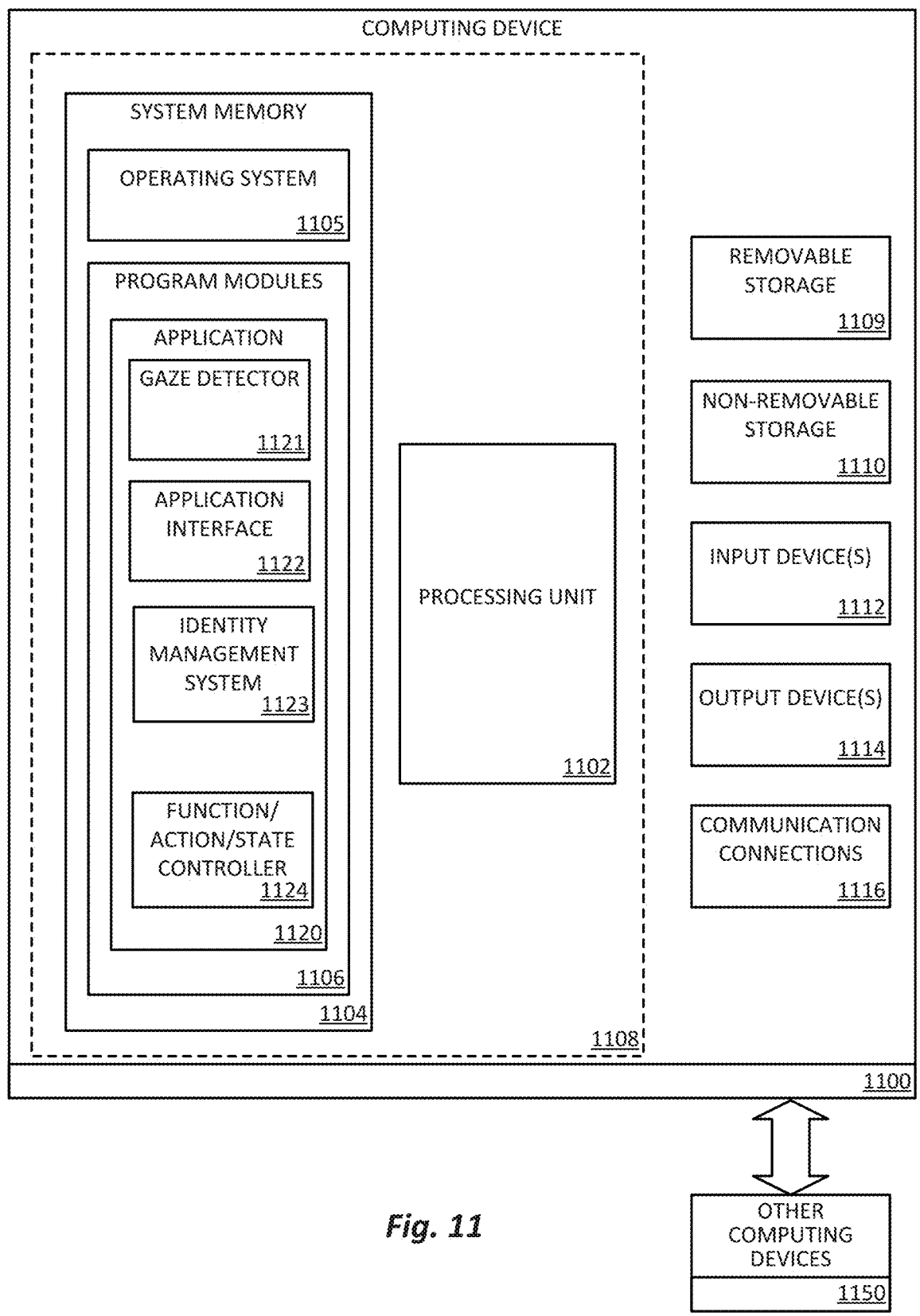
FIG. 11 depicts a block diagram illustrating physical components of a computing system with which aspects of the disclosure may be practiced.
Figure 12A:
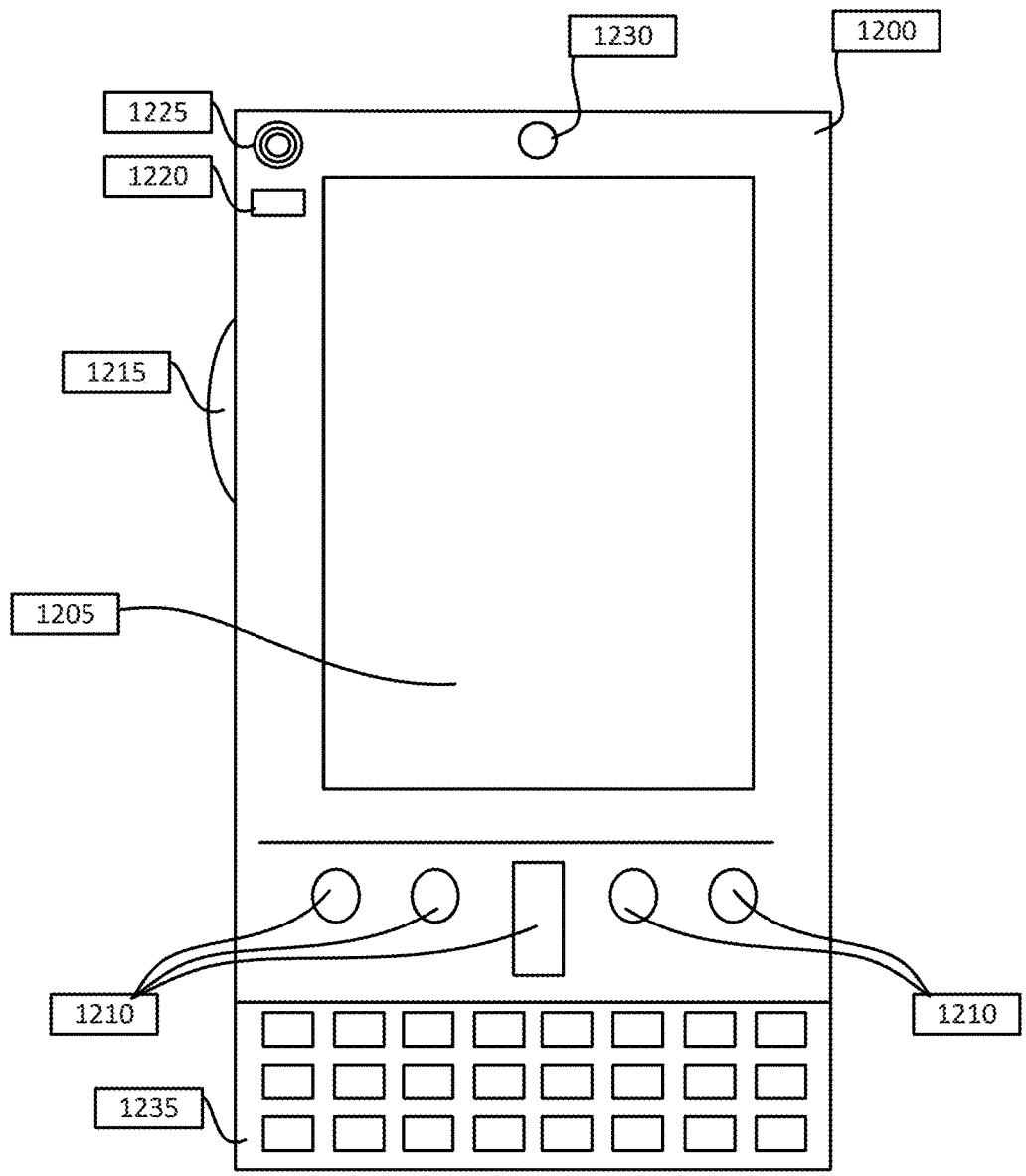
FIGS. 12A-12B depict details of one or more computing systems in accordance with examples of the present disclosure.
Figure 12B:
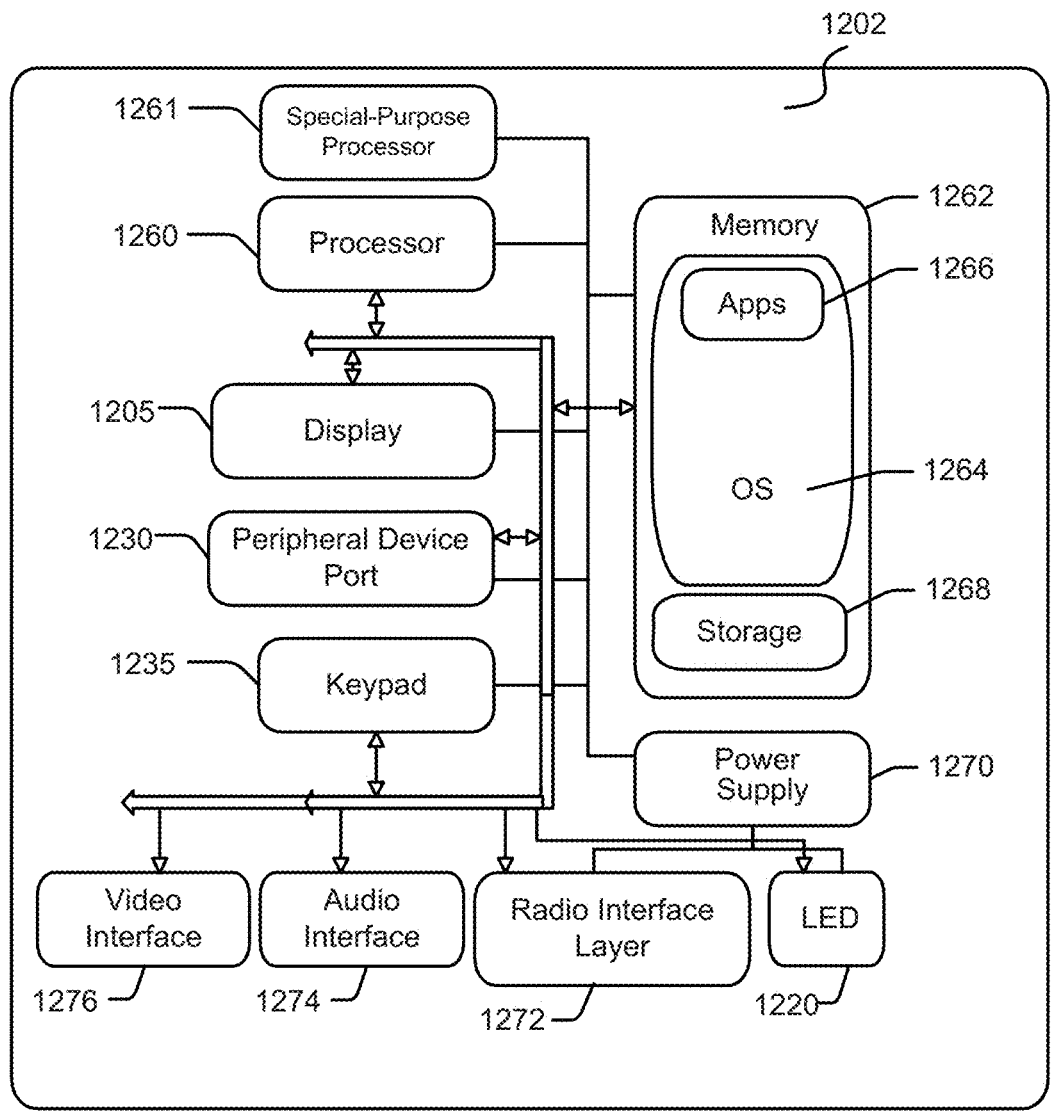
Figure 13:
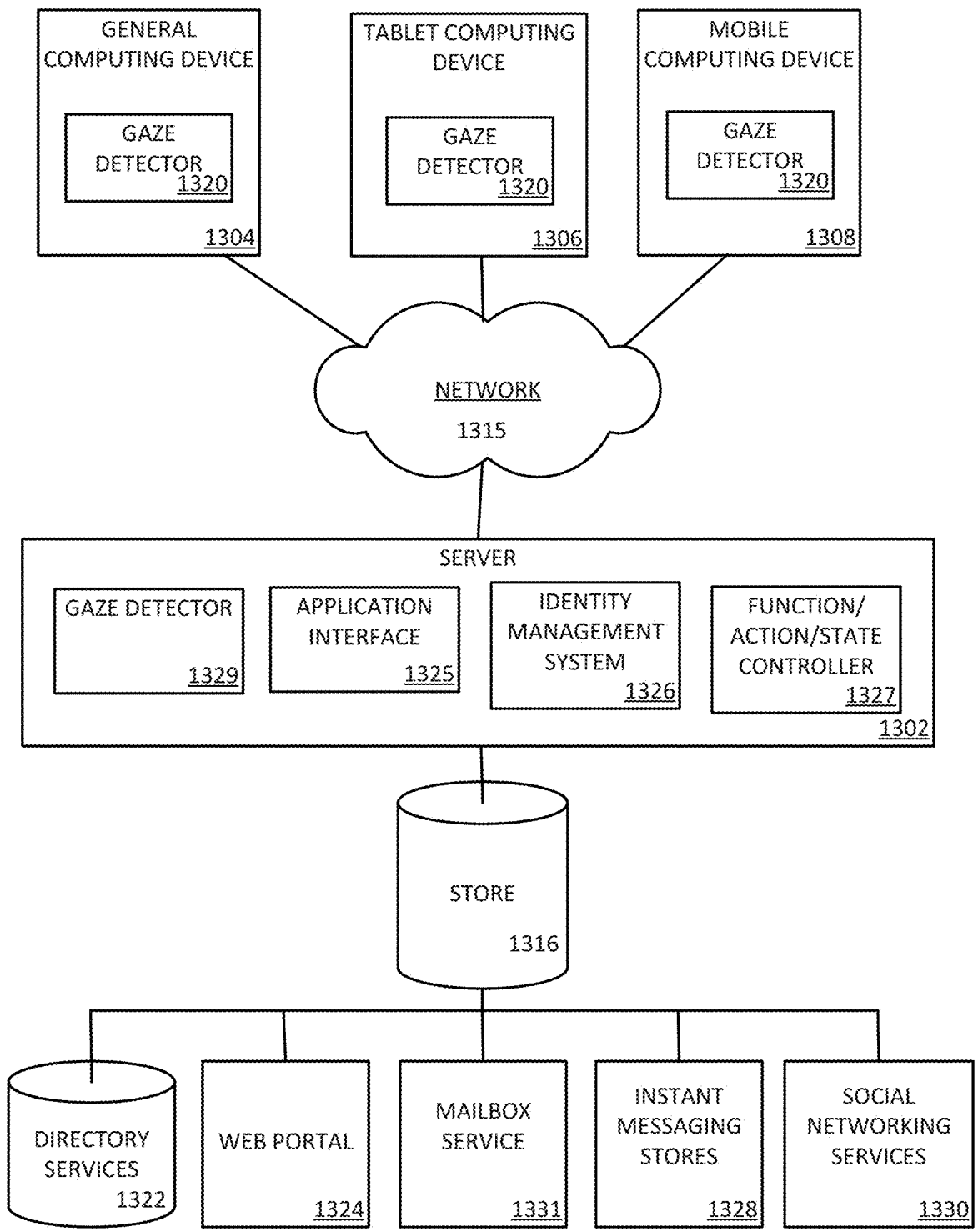
FIG. 13 depicts an architecture of a system for processing data received at a computing system in accordance with examples of the present disclosure.

FIGS. 11-13 and the associated descriptions provide a discussion of a variety of operating environments in which aspects of the disclosure may be practiced. However, the devices and systems illustrated and discussed with respect to FIGS. 11-13 are for purposes of example and illustration and are not limiting of a vast number of computing device configurations that may be utilized for practicing aspects of the disclosure, described herein.

FIG. 11 is a block diagram illustrating physical components (e.g., hardware) of a computing device 1100 with which aspects of the disclosure may be practiced. The computing device components described below may be suitable for the computing and/or processing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random-access memory (RAM)), non-volatile storage (e.g., read-only memory (ROM)), flash memory, or any combination of such memories.

The system memory 1104 may include an operating system 1105 and one or more program modules 1106 suitable for running software application 1120, such as one or more components supported by the systems described herein. As examples, system memory 1104 may include the gaze detector 1121, the application interface 1122, the identity management system 1123, and/or the function/action/state controller 1124. The gaze detector 1121 may be the same as or similar to the gaze detector 612 as previously described; the application interface 1122 may be the same as or similar to the application interface 624 as previously described; the identity management system 1123 may be the same as or similar to the identity management system 628 as previously described; and the function/action/state controller 1124 may be the same as or similar to the function/action/state controller 636 as previously described. The operating system 1105, for example, may be suitable for controlling the operation of the computing device 1100.

Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., software applications 1120) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1100 may also have one or more input device(s) 1112 such as a keyboard, a mouse, a pen, a sound or voice input device, a touch or swipe input device, etc. The one or more input device 1112 may include an image sensor, such as the image sensor 620 and/or the image sensor 632. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 12A-12B illustrate a mobile computing device 1200, for example, a mobile telephone, a smart phone, wearable computer (such as a smart watch), a tablet computer, a laptop computer, and the like, with which embodiments of the disclosure may be practiced. In some respects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display).

If included, an optional side input element 1215 allows further user input. The side input element 1215 may be a rotary switch, a button, or any other type of manual input element. In alternative aspects, mobile computing device 1200 may incorporate greater or fewer input elements. For example, the display 1205 may not be a touch screen in some embodiments.

In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display.

In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, maps programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200 described herein (e.g., search engine, extractor module, relevancy ranking module, answer scoring module, etc.).

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like. The onboard camera may be the same as or similar to the previously described image sensor 620 and/or 632.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 3068.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

FIG. 13 illustrates one aspect of the architecture of a system for processing data received at a computing system from a remote source, such as a personal computer 1304, tablet computing device 1306, or mobile computing device 1308, as described above. The personal computer 1304, tablet computing device 1306, or mobile computing device 1308 may include the gaze detector 1320 as previously described. Content at a server device 1302 may be stored in different communication channels or other storage types. For example, various documents may be stored using a directory service 1322, a web portal 1324, a mailbox service 1331, an instant messaging store 1328, or social networking services 1330.

One or more of the previously described program modules 1106 or software applications 1120 may be employed by server device 1310 and/or the personal computer 1304, tablet computing device 1306, or mobile computing device 1308, as described above. For example, the server device 1302 may include the gaze detector 1329, the application interface 1325, the identity management system 1326, and/or the function/action/state controller 1327. The gaze detector 1329 may be the same as or similar to the gaze detector 612 as previously described; the application interface 1325 may be the same as or similar to the application interface 624 as previously described; the identity management system 1326 may be the same as or similar to the identity management system 628 as previously described; and the function/action/state controller 1327 may be the same as or similar to the function/action/state controller 636 as previously described The server device 1302 may provide data to and from a client computing device such as a personal computer 1304, a tablet computing device 1306 and/or a mobile computing device 1308 (e.g., a smart phone) through a network 1315. By way of example, the computer system described above may be embodied in a personal computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Examples of the present disclosure are directed to a method for controlling a function via gaze detection. The method may include receiving one or more images of a user; determining gaze information from the received one or more images; receiving non-gaze information when the gaze information is determined to satisfy a condition; and enabling a function based on the non-gaze information.

In accordance with at least one aspect of the above example, the non-gaze information includes a stored image of the user; and enabling the function includes authenticating the user for access to an access controlled system. In accordance with at least one aspect of the above example, the method may include receiving one or more second images including the user and a second user; determining second gaze information for the second user from the received one or more second images; identifying the second user associated with the second gaze information; and enabling the function includes causing a display of content displayed at a display device to be modified based on the identity of the second user. In accordance with at least one aspect of the above example, the method may include determining content displayed at the display device; and obscuring less than all of the content displayed at the display device based on the identity of the second user. In accordance with at least one aspect of the above example, the function includes one or more of controlling a brightness of a display device, resetting an inactivity timer, and obtaining a second image. In accordance with at least one aspect of the above example, determining gaze information from the received one or more images includes: extracting a plurality of features from the received one or more images; providing the plurality of features to a neural network; and determining, utilizing the neural network, a location at a display device at which a gaze of the user is directed. In accordance with at least one aspect of the above example, the gaze information is determined to satisfy the condition when the location at the display device at which the gaze of the user is directed coincides with a region including a graphical element. In accordance with at least one aspect of the above example, determining gaze information from the received one or more images includes: extracting a plurality of features from the received one or more images; providing the plurality of features to a neural network; and determining, utilizing the neural network, a location at a location other than a display device at which a gaze of the user is directed. In accordance with at least one aspect of the above example, the method may include determining, utilizing the neural network, a future predicted location at the display device associated with a future predicted gaze of the user.

Examples of the present disclosure are directed to a system for controlling a function via gaze detection. The system may include a processor; an image sensor; and memory including instructions, which when executed by the processor, cause the processor to receive one or more images of a user from the image sensor; determine gaze information from the received one or more images; determine if the gaze information satisfies a condition; receive non-gaze information associated with at least one of a function or application of a computing system when the gaze information satisfies the condition; and enable the at least one function or application based on non-gaze information.

In accordance with at least one aspect of the above example, at least one processor is a neural processing unit. In accordance with at least one aspect of the above example, the instructions, when executed by the processor, cause the processor to receive second one or more images including the user and a second user; determine second gaze information for the second user from the received second one or more images; identify the second user associated with the second gaze information; and cause a display of content displayed at a display device to be modified based on the identity of the second user. In accordance with at least one aspect of the above example, the instructions, when executed by the processor, cause the processor to: obscure less than all of the content displayed at the display device based on the identity of the second user. In accordance with at least one aspect of the above example, the at least one function or application at least one of controls a brightness of a display device, resets an inactivity timer, obtains a second image, changes a font size, changes resolution, and changes a display refresh rate. In accordance with at least one aspect of the above example, the instructions, when executed by the processor, cause the processor to: extract a plurality of features from the received one or more images; provide the plurality of features to a neural network; and determine, utilizing the neural network, a location at a display device at which a gaze of the user is directed. In accordance with at least one aspect of the above example, the gaze information satisfies the condition when the location at the display device at which the gaze of the user is directed coincides with a region including a graphical element. In accordance with at least one aspect of the above example, the instructions, when executed by the processor, cause the processor to: extract a plurality of features from the received one or more images; provide the plurality of features to a neural network; and determine, utilizing the neural network, a location at a location other than a display device at which a gaze of the user is directed. In accordance with at least one aspect of the above example, the instructions, when executed by the processor, cause the processor to determine a predicted location at the display device associated with a predicted gaze of the user.

Examples of the present disclosure are directed to a computer storage medium including instructions, which when executed by a processor, cause the processor to: receive one or more images of a user from an image sensor; determine gaze information from the received one or more images; determine if the gaze information satisfies a condition; receive device dependent information associated with at least one of a function or application of a computing system when the gaze information is determined to satisfy the condition; and enable at least one function or application based on the device dependent information. In accordance with at least one aspect of the above example, the instructions, which when executed by a processor, cause the processor to: extract a plurality of features from the received one or more images; provide the plurality of features to a neural network; and determine, utilizing the neural network, a location at a display device at which a gaze of the user is directed, wherein, the gaze information satisfies the condition when the location at a display device at which the gaze of the user is directed coincides with a region including a graphical element associated with the at least one function or application.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for controlling a function via gaze detection, the method comprising:
   receiving one or more images of a user of a computing device;
   determining current gaze information for the user from the received one or more images;
   determining the current gaze information satisfies a condition; and
   based on determining the current gaze information satisfies the condition:
      obtaining non-gaze information, wherein the non-gaze information comprises a classification of user activity from a set of activities, wherein the non-gaze information comprises a classification of user activity from a set of activities, the set of activities comprising running and driving; and
      controlling, based on the current gaze information and the non-gaze information, a function of the computing device.

2. The method of claim 1, wherein:
   the non-gaze information includes a stored image of the user; and
   the function includes authenticating the user for access to an access controlled system.

3. The method of claim 1, wherein the non-gaze information comprises device movement.

4. The method of claim 3, wherein the function includes at least one of controlling a brightness of a display device or resetting an inactivity timer.

5. The method of claim 3, further comprising determining the user is capturing a photo based on the current gaze information and the device movement indicating a still state.

6. The method of claim 1, further comprising rendering an emergency user interface element based on the classification of the user activity.

7. The method of claim 1, wherein determining the current gaze information from the received one or more images includes:
    extracting a plurality of features from the received one or more images;
    providing the plurality of features to a neural network; and
    determining, utilizing the neural network, where a current gaze of the user is directed.

8. The method of claim 1, wherein at least one function or application of the computing system is controlled by a combination of the current gaze information and another signal.

9. A system for controlling a function via gaze detection, the system comprising:
    a processor;
    an image sensor; and
    memory including instructions, which when executed by the processor, cause the processor to:
        receive one or more images of a user from the image sensor;
        determine current gaze information for the user from the received one or more images;
        determine the current gaze information satisfies a condition; and
        based on determining the current gaze information satisfies the condition:
            obtaining non-gaze information, wherein the non-gaze information comprises a classification of user activity from a set of activities, the set of activities comprising running and driving; and
            controlling, based on the current gaze information and the non-gaze information, a function of the system.

10. The system of claim 9, wherein:
    the non-gaze information includes a stored image of the user; and
    the function includes authenticating the user for access to an access controlled system.

11. The system of claim 9, wherein the non-gaze information comprises device movement.

12. The system of claim 11, wherein the function includes at least one of controlling a brightness of a display device or resetting an inactivity timer.

13. The system of claim 11, further comprising determining the user is capturing a photo based on the current gaze information and the device movement indicating a still state.

14. The system of claim 9, wherein the non-gaze information comprises a classification of user activity from a set of activities, the set of activities comprising running and driving.

15. The system of claim 14, further comprising rendering an emergency user interface element based on the classification of the user activity.

16. The system of claim 9, wherein determining the current gaze information from the received one or more images includes:
    extracting a plurality of features from the received one or more images;
    providing the plurality of features to a neural network; and
    determining, utilizing the neural network, where a current gaze of the user is directed.

17. A computer-readable non-transitory recording medium storing computer-executable program instructions that when executed by a processor, cause a computer to execute a controlling a function via gaze detection the method comprising:
    receive one or more images of a user from an image sensor;
    determine current gaze information for the user from the received one or more images;
    determine if the current gaze information satisfies a condition; and
    when the current gaze information satisfies the condition:
        obtain device dependent information associated with at least one of a function or application of a computing system, wherein the device dependent information relates to motion of the computing system; and
        obtain non-gaze information, wherein the non-gaze information comprises a classification of user activity from a set of activities, the set of activities comprising running and driving; and
        control, based on the current gaze information, non-gaze information, and the device dependent information, at least one function or application of the computing system.

18. The computer-readable non-transitory recording medium according to claim 17, wherein the at least one function includes at least one of controlling a brightness of a display device or resetting an inactivity timer.

19. The computer-readable non-transitory recording medium according to claim 17, wherein the instructions further comprise determining the user is capturing a photo based on the current gaze information and the motion of the computing system indicating a still state.

20. The computer-readable non-transitory recording medium according to claim 17, wherein determining the current gaze information from the received one or more images includes:
    extracting a plurality of features from the received one or more images;
    providing the plurality of features to a neural network; and
    determining, utilizing the neural network, where a current gaze of the user is directed.

* * * * *